United States Patent
White et al.

(10) Patent No.: US 7,634,138 B2
(45) Date of Patent: Dec. 15, 2009

(54) METHOD FOR GENERATING AN IMAGE OF A DETECTED SUBJECT

(75) Inventors: Timothy J. White, Webster, NY (US); Jean M. Miskelly, Atlanta, GA (US); Douglas W. Christoffel, Rochester, NY (US); Mary A. Hadley, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1454 days.

(21) Appl. No.: 10/324,472

(22) Filed: Dec. 20, 2002

(65) Prior Publication Data

US 2004/0120009 A1 Jun. 24, 2004

(51) Int. Cl.
*G06K 9/62* (2006.01)

(52) U.S. Cl. .................... 382/209; 382/165; 345/619

(58) Field of Classification Search ............... 382/115, 382/118, 159, 180, 209, 154, 162, 165, 285, 382/240; 396/2, 324, 3, 329, 326; 378/5, 378/19, 134; 348/218.1, 586, 584, 335; 351/211; 250/201.4; 345/619; 355/22

See application file for complete search history.

(56) References Cited

U.S. PATENT DOCUMENTS

| | | | |
|---|---|---|---|
| 5,148,477 A * | 9/1992 | Neely et al. ................ | 382/107 |
| 5,550,928 A * | 8/1996 | Lu et al. .................... | 382/116 |
| 5,629,752 A | 5/1997 | Kinjo | |
| 5,835,616 A | 11/1998 | Lobo et al. | |
| 5,986,671 A | 11/1999 | Fredlund et al. | |
| 6,025,827 A * | 2/2000 | Bullock et al. ............. | 715/201 |
| 6,075,542 A | 6/2000 | Fredlund et al. | |
| 6,157,435 A | 12/2000 | Slater et al. | |
| 6,298,145 B1 * | 10/2001 | Zhang et al. ................ | 382/103 |
| 6,629,104 B1 * | 9/2003 | Parulski et al. ............. | 707/102 |
| 6,829,384 B2 * | 12/2004 | Schneiderman et al. ..... | 382/154 |
| 6,940,545 B1 * | 9/2005 | Ray et al. ................ | 348/222.1 |
| 7,027,659 B1 * | 4/2006 | Thomas ...................... | 382/254 |
| 7,154,510 B2 * | 12/2006 | Simon et al. ................ | 345/619 |
| 2001/0011262 A1 * | 8/2001 | Hoyt et al. ...................... | 707/1 |
| 2002/0089516 A1 | 7/2002 | Sobol | |
| 2003/0081249 A1 * | 5/2003 | Ahmad et al. .............. | 358/1.15 |

OTHER PUBLICATIONS

U.S. Appl. No. 09/514,436, filed Feb. 28, 2000 and entitled: Face Detecting Camera and Method, by Lawrence A. Ray, et al (Kodak Docket 77522).

(Continued)

*Primary Examiner*—Sheela Chawan
(74) *Attorney, Agent, or Firm*—Roland R. Schindler; Kathleen Newner Manne; Eugene I. Shkurko

(57) ABSTRACT

A method of generating an image. The method comprises the steps of: accessing a digital still image comprising a plurality of subjects; applying a subject detection algorithm to the digital still image to detect the plurality of subjects to generate a plurality of subject images, each of the subject images comprising at least one detected subject; and displaying, on a display of the imaging device, at least one portion of the digital still image comprising one of the plurality of subject images.

24 Claims, 23 Drawing Sheets

OTHER PUBLICATIONS

"Finding People and Animals by Guided Assembly" by D.A. Forsyth and M. M. Fleck, 1997 IEEE, pp. 5-8.

"Face Detection from Color Images Using a Fuzzy Pattern Matching Method", IEEE Transaction on Pattern Analysis and Machine Intelligence, vol. 21, No. 6, Jun. 1999, pp. 557-563.

"A Statistical Method for 3D Object Detection Applied to Faces and Cars" by Henry Schneiderman and Takeo Kanade, 2000 IEEE, pp. 746-751.

"Combining Structure, color and Texture for Image Retrieval: A Performance Evaluation" by Qasim Iqbal and J.K. Aggarwal, 2002 IEEE.

* cited by examiner

METHOD FOR GENERATING AN IMAGE OF A DETECTED SUBJECT

CROSS REFERENCE TO RELATED APPLICATION

Reference is made to commonly assigned application U.S. Ser. No. 09/514,436, entitled "FACE DETECTING CAMERA AND METHOD", filed on 28 Feb. 2000 in the names of Ray et al., and which is assigned to the assignee of this application.

FIELD OF THE INVENTION

The invention relates generally to the field of digital imaging. More specifically, the invention relates to a method for generating an image.

BACKGROUND OF THE INVENTION

Many people enjoy the field of photography—from the casual and amateur photographer to the professional—and many attempts are made to capture a pleasing photograph of a subject. In some situations, more than one subject can be captured in one photograph, and it is desired to separate or isolate one subject from the plurality of subjects to generate a photograph of just the one subject.

For example, portrait images are a popular type of photograph/image taken by both professional photographers and amateur photographers. These portrait images typically show a head and shoulder portrait of one or more individuals. For example, portrait images are popular for school year books and graduation pictures. If a photograph of a group of individuals is captured, it may be desired to obtain a portrait image of just one of the individuals. In another example, a photograph may include a plurality of subjects, such as a house, barn, tree, and horse, and it may be desired to generate a photograph of just the horse.

Some software methods are known wherein a user can outline the desired subject from a particular image. However, such software methods are tedious and are not suited for a novice user of the software.

Accordingly, there exists a need for an automated method for generating an image of a detected subject.

The present invention provides a method for an automated method for generating an image of a detected subject.

SUMMARY OF THE INVENTION

An object of the present invention is to provide a method for generating an image of a detected subject.

Another object of the present invention is to provide such a method that is automated so as to be suitable for use by a casual user.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method of generating an image. The method comprises the steps of: accessing a digital still image comprising a plurality of subjects; applying a subject detection algorithm to the digital still image to detect the plurality of subjects to generate a plurality of subject images, each of the subject images comprising at least one detected subject; and displaying, on a display of the imaging device, at least one portion of the digital still image comprising one of the plurality of subject images.

According to another aspect of the invention, there is provided a method of generating an image. The method comprises the steps of: accessing a digital still image comprising a plurality of subjects; applying a subject detection algorithm to the digital still image to detect the plurality of subjects to generate a plurality of subject images, each of the subject images comprising at least one detected subject; displaying the plurality of subject images on a display of an imaging device; providing a selection member for selecting at least one of the plurality of subject images; displaying, on the display, a plurality of candidate images, each of the candidate images comprising a template and the selected at least one of the plurality of subject images, the template of one candidate image differing from the template of another candidate image; providing a selection member for selecting one of the plurality of candidate images; and displaying on the display the selected one of the plurality of candidate images.

According to a further aspect of the invention, there is provided a method of generating an image. The method comprises the steps of: accessing a digital still image comprising a plurality of subjects; applying a subject detection algorithm to the digital still image to detect the plurality of subjects to generate a plurality of subject images, each of the subject images comprising at least one detected subject; displaying the plurality of subject images on the display of the imaging device; providing a selection member for selecting at least one of the plurality of subject images; displaying, on the display, the selected at least one of the plurality of subject images and a plurality of candidate templates, one candidate template differing from another candidate template; providing a selection member for selecting one of the candidate templates; and displaying, on the display, a candidate image comprising the selected at least one of the plurality of subject images and the selected one of the candidate templates.

According to yet another aspect of the invention, there is provided a method of generating a photo collage. The method comprises the steps of: accessing a digital still image comprising a plurality of subjects; applying a subject detection algorithm to the digital still image to detect the plurality of subjects to generate a plurality of subject images, each of the subject images comprising one detected subject; forming a photo collage comprising the plurality of subject images; and displaying the photo collage on the display of the imaging device.

According to yet a further aspect of the invention, there is provided a method of generating a photo collage. The method comprises the steps of: accessing a digital still image comprising a plurality of subjects; applying a subject detection algorithm to the digital still image to detect the plurality of subjects to generate a plurality of subject images, each of the subject images comprising at least one detected subject; providing a template having a predetermined location adapted to receive one of the plurality of subject images; generating a plurality of template images, each template image comprising the template and one of the plurality of subject images disposed within the predetermined location; forming a photo collage comprising the plurality of template images; and displaying the photo collage on the display of the imaging device.

According to yet a further aspect of the invention, there is provided a method of generating a photo collage. The method comprises the steps of: accessing a digital still image comprising a plurality of subjects; applying a subject detection algorithm to the digital still image to detect the plurality of subjects to generate a plurality of subject images, each of the subject images comprising one detected subject; providing a first and second template, the first and second template each having a predetermined location adapted to receive one of the plurality of subject images; categorizing the content of each of the plurality of subject images; associating one of the two templates with each of the plurality of subject images in accordance with the categorization; generating a plurality of template images, each template image comprising the one of the plurality of subject images and the associated template wherein the one of the plurality of subject images is disposed within the predetermined location of the associated template; forming a photo collage comprising the plurality of template images; and displaying the photo collage on the display of the imaging device.

According to yet a further aspect of the invention, there is provided a method of generating an image. The method comprises the steps of: accessing a digital still image comprising a plurality of subjects; applying a subject detection algorithm to the digital still image to detect the plurality of subjects to generate a plurality of subject images, each of the subject images comprising one detected subject; providing means for indicating a number of subject images to be selected; providing a selection member for selecting the subject images; and displaying, on a display of an imaging device, at least one candidate image, the candidate image comprising the selected subject images.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
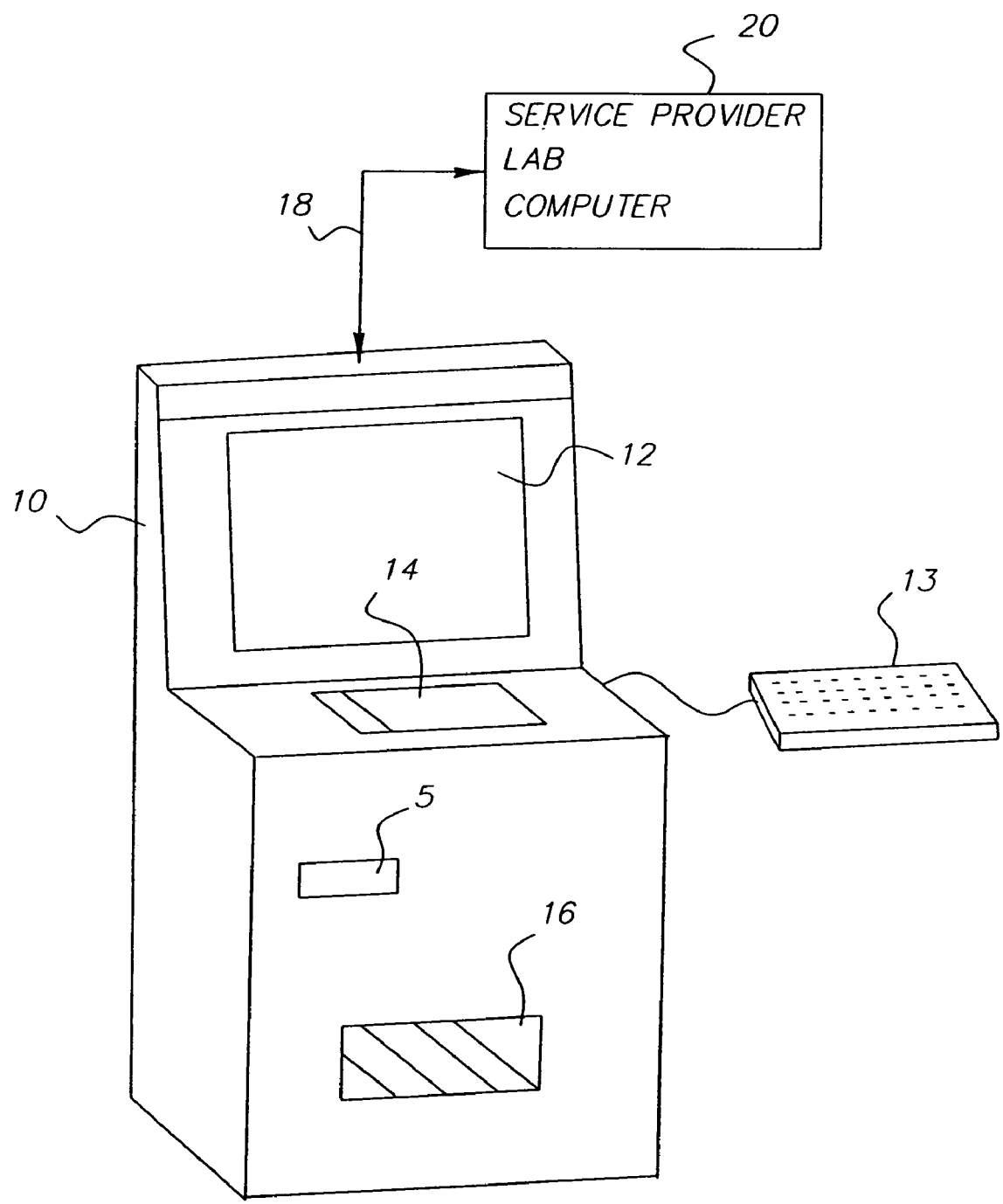
FIG. 1 shows a digital imaging device configured as a kiosk.

The following is a detailed description of the preferred embodiments of the invention, reference being made to the drawings in which the same reference numerals identify the same elements of structure in each of the several figures.

The present invention employs a digital imaging device adapted to display a digital image. Digital imaging devices include digital cameras, video recorders, kiosks, PDAs, cellular phones having image capability, and the like.

An example of a digital imaging device configured as a kiosk is a Picture Maker™ kiosk produced by Eastman Kodak Company, generally illustrated in FIG. 1 as kiosk 10. As illustrated, kiosk 10 includes a display 12 for displaying a digital still image. Display 12 can be a touchscreen display, whereby a user can provide information and data to kiosk 10, or a keyboard 13 can be employed to provide information and data. A scanner 14 can be provided for receiving a user-supplied visual image (such as a photographic print) and converting the visual image into digital form for display on display 12. Alternatively, the image can be provided in digital form on a removable memory device such as a memory card, memory stick, floppy disk, compact disc, PictureCD, or the like. Kiosk 10 can include an input port 15 to receive the removable memory device. Kiosk 10 can further include a delivery section 16 for controlling the delivery of a medium, such as a hardcopy print if kiosk 10 includes a printer (not shown). Delivery section 16 is illustrated in FIG. 1 as an opening in kiosk 10. Kiosk 10 can transmit digital data over a communication network 18 to a third party 20. Third party 20 can be a service provider, lab, computer, or the like. Transmission to third party 20 might be desired if kiosk 10 cannot generate a particular image product or if the user of kiosk 10 wishes to share the image with another individual.

Figure 2:
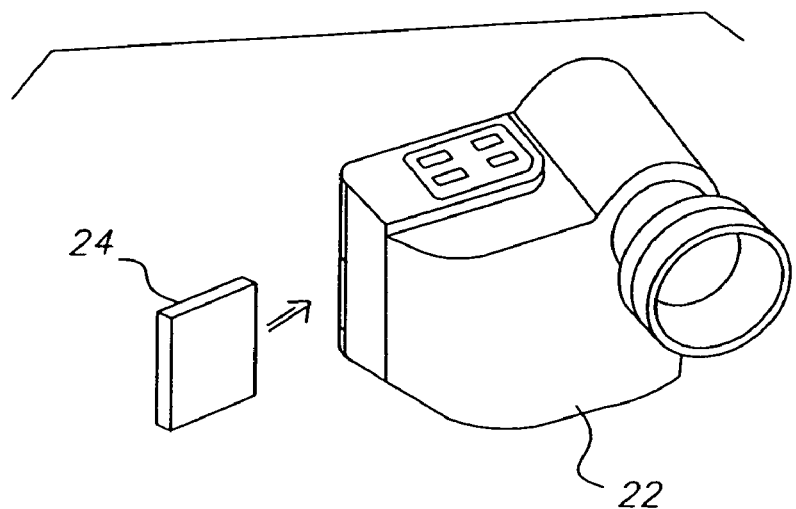
FIG. 2 shows a digital imaging device configured as a digital camera.
Figure 3:
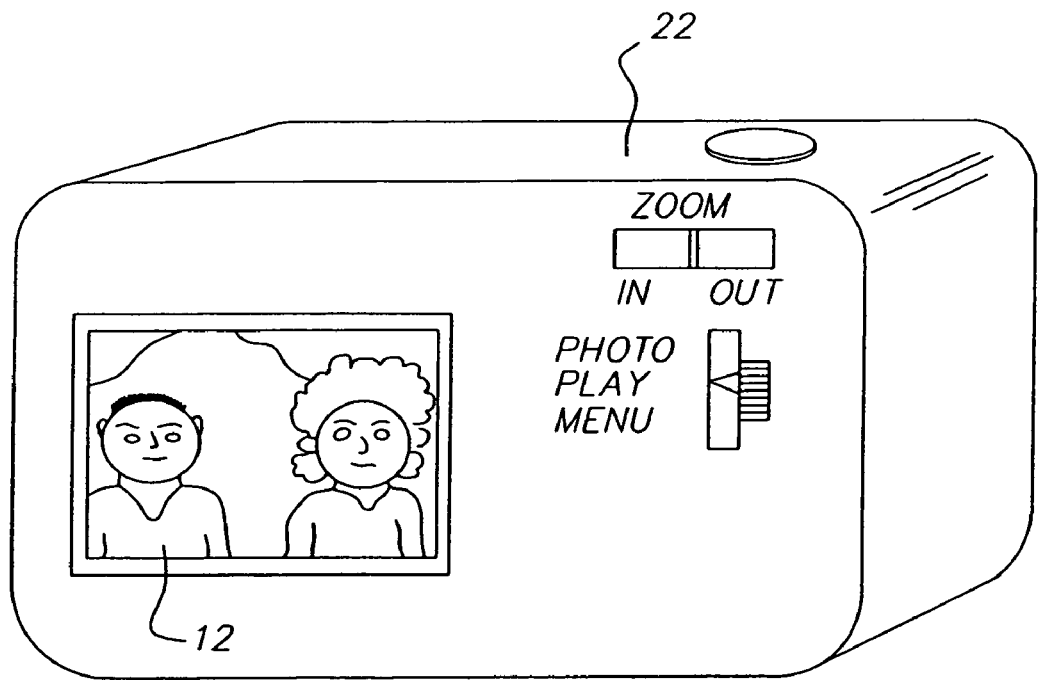
FIG. 3 shows a rear view of the digital camera of FIG. 2.

An example of a digital imaging device configured as a digital camera is generally shown in FIGS. 2 and 3 as digital camera 22. Digital camera 22 is adapted to receive a removable memory device 24 such as a memory card, memory stick, floppy disk, compact disc, PictureCD or the like. Digital camera 22 further includes display 12 for viewing a captured image.

For ease of convenience only, the present invention will be disclosed with reference to a digital imaging device configured as a kiosk.

A preferred use of the present invention is intended for images of individuals/people. However, the present invention can be applied to images of other objects, such as inanimate objects (e.g., trees, houses, cars, and the like) or animals (e.g., cats, dogs, and the like). For ease of convenience only, the present invention will be disclosed with reference to the subjects being individuals. Therefore, the term "subject" refers to and includes subjects/objects, whether human, animate, inanimate, sentient, or non-sentient.

First Embodiment

In a first embodiment of the present invention, at least one subject is extracted from a digital still image comprising a plurality of subjects.

Figure 4:
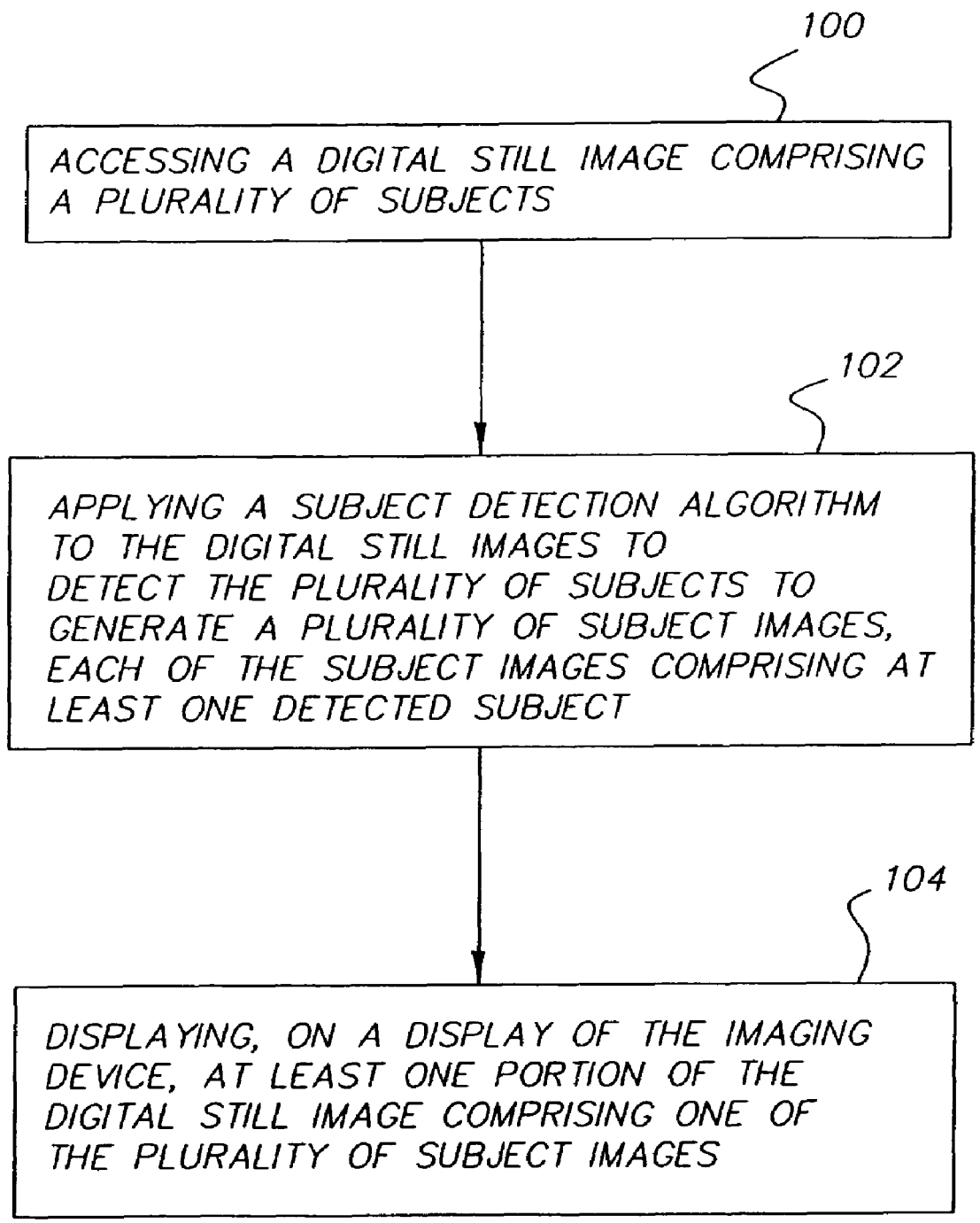
FIG. 4 shows a flow diagram of a method in accordance with a first embodiment of the present invention.

FIG. 4 shows a flow diagram of a method for generating an image in accordance with a first embodiment of the present invention. At step 100, a digital still image comprising a plurality of subjects is accessed. A subject detection algorithm is then applied to the digital still image to detect the plurality of subjects to generate a plurality of subject images, wherein each of the subject images comprises at least one detected subject (step 102). At step 104, a portion of the digital still image is displayed, wherein the displayed portion comprises one of the plurality of subject images.

The steps of the method diagrammed in FIG. 4 are now more particularly described with reference to an example employing FIGS. 5-6. In the example provided, people are the subjects, and the method of the present invention is particularly suited for faces and/or portrait images.

At step 100, a digital still image comprising a plurality of subjects is accessed. FIG. 5 shows a digital still image 30 displayed on display 12, with digital still image 30 comprising a plurality of subjects, specifically, 5 subjects wherein the subjects are people. Digital still image 30 can be accessed by methods disclosed above, including scanning using scanner 14 or by means of a removable media and input port 15.

At step 102, a subject detection algorithm/technique (hereinafter, algorithm) is applied to digital still image 30 to detect the plurality of subjects to generate a plurality of subject images, wherein each of the subject images comprises at least one detected subject. Algorithms for detecting objects or subjects of an image are known and can be employed in the present invention, and can be automatic or manually assisted. A manually assisted algorithm might include having a user indicate a particular subject(s). U.S. Pat. No. 5,835,616 (Lobo) teaches a face detection system. U.S. Pat. No. 5,629,752 (Kinjo) teaches the detection of a human face. Wu et al. published a face detection algorithm that is well suited for inclusion in a digital camera in "Face Detection from Color Images Using a Fuzzy Pattern Matching Method", Wu et al, IEEE Trans. Pattern Analysis and Machine Intelligence 21 (6), pages 557-563, 1999. Other subject detection algorithms are referenced in (1) U.S. Patent Application No. 2002/0089515A1 (Sobol), (2) H. Schneiderman and T. Kanade, "A statistical method for 3D object detection applied to faces and cars", In Proceedings of Computer Vision and Pattern Recognition, 2000, (3) Q. Iqbal and J. Aggarwal, "Combining Structure, Color and Texture for Image Retrieval: A Performance Evaluation", In Proceedings of International Conference on Pattern Recognition, 2002, and (4) Forsyth, D. A.; Fleck, M. M, "Finding people and animals by guided assembly", in Proceedings, International Conference on Image Processing, p. 5-8 vol. 3. 1997. These detection references are incorporated herein by reference.

At step 104, at least one portion of digital still image 30 is displayed on display 12, wherein the displayed at least one portion comprises one of the plurality of subject images on a display of the imaging device. Preferably, a plurality of portions are displayed, wherein the plurality is equal to the number of subject detected. That is, one portion for each detected subject is preferably displayed. FIG. 6 shows a plurality of subjects detected from digital still image 30. More specifically, FIG. 6 shows the 5 subjects of digital still image 30 detected using the subject detection algorithm. The 5 detected subjects are shown in FIG. 6 as subject images I1-I5. Each of subject images I1-I5 comprises a portion of digital still image 30 including one detected subject. These subject images I1-I5 are displayed on display 12.

Second Embodiment

In a second embodiment of the present invention, at least one subject is extracted from an image and merged with a single template.

Figure 7:
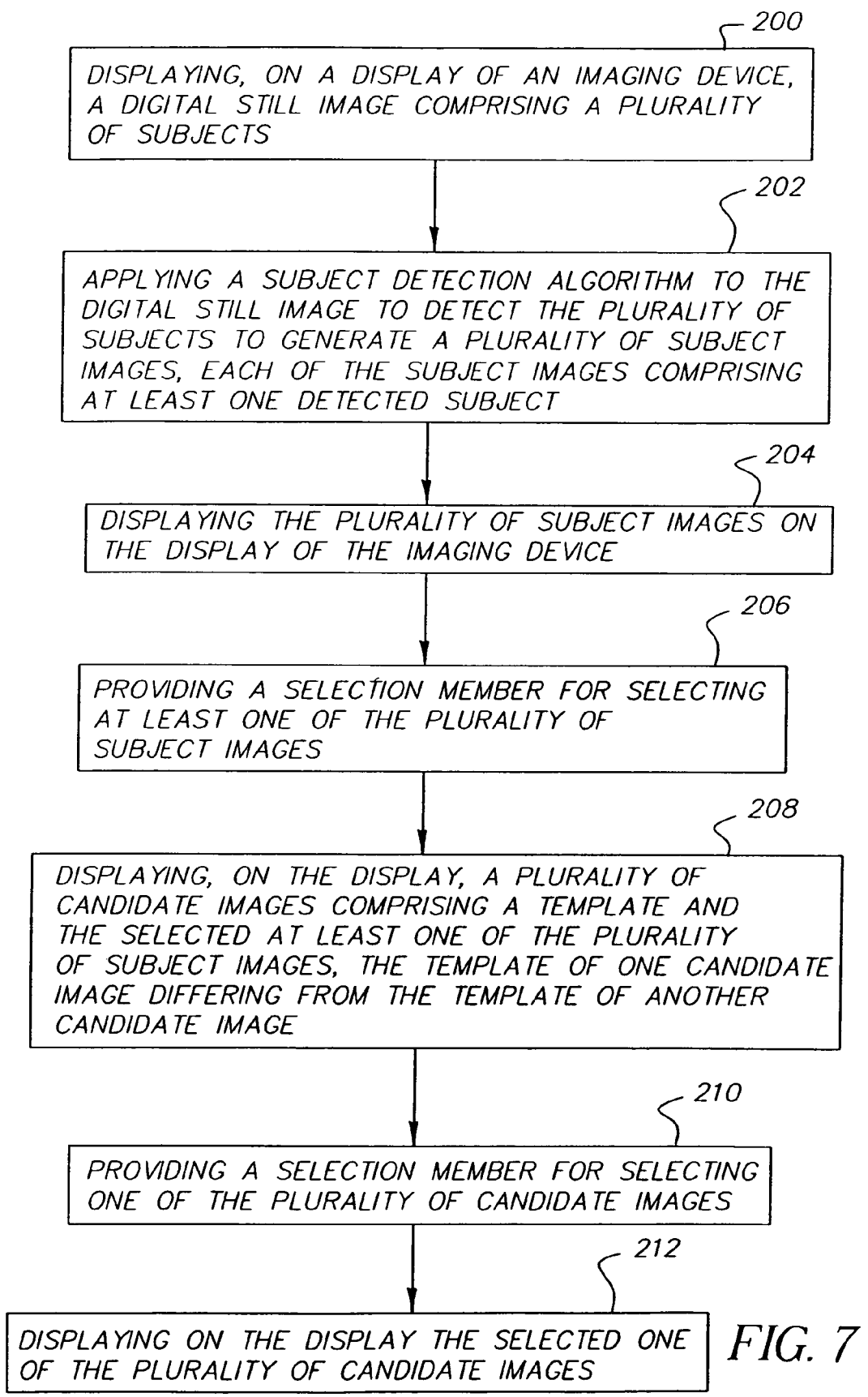
FIG. 7 shows a flow diagram of a method in accordance with a second embodiment of the present invention.

FIG. 7 shows a flow diagram of a method for generating an image in accordance with a second embodiment of the present invention. At step 200, a digital still image comprising a plurality of subjects is accessed. In a preferred embodiment, the digital still image is displayed on display 12 of kiosk 10. A subject detection algorithm is applied to the digital still image to detect the plurality of subjects and generate a plurality of subject images, wherein each of the subject images comprises at least one detected subject (step 202). At step 204, each of the plurality of subject images is displayed on display 12 of kiosk 10. Kiosk 10 includes a selection member for selecting at least one of the plurality of subject images (step 206). At step 208, a plurality of candidate images is displayed on display 12. Each of the candidate images comprises a template and the selected at least one of the plurality of subject images. The template of one candidate image differs from the template of another candidate image. One of the plurality of candidate images is then selected using a selection member of kiosk 10 (step 210), and the selected one of the plurality of candidate images is then displayed on display 12 (step 212). The displayed candidate image can then be stored, transmitted, or printed, if desired.

The steps of the method diagrammed in FIG. 7 are now more particularly described with reference to an example employing FIGS. 5 and 8-10.

At step 200, a digital still image comprising a plurality of subjects is displayed on display 12 of kiosk 10. Referring again to FIG. 5, FIG. 5 shows a digital still image 30 displayed on display 12, with digital still image 30 comprising a plurality of 5 subjects, more specifically, 5 people/adults.

At step 202, a subject detection algorithm is applied to digital still image 30 to detect the plurality of subjects and generate a plurality of subject images, wherein each of the subject images comprises at least one detected subject.

Figure 8:
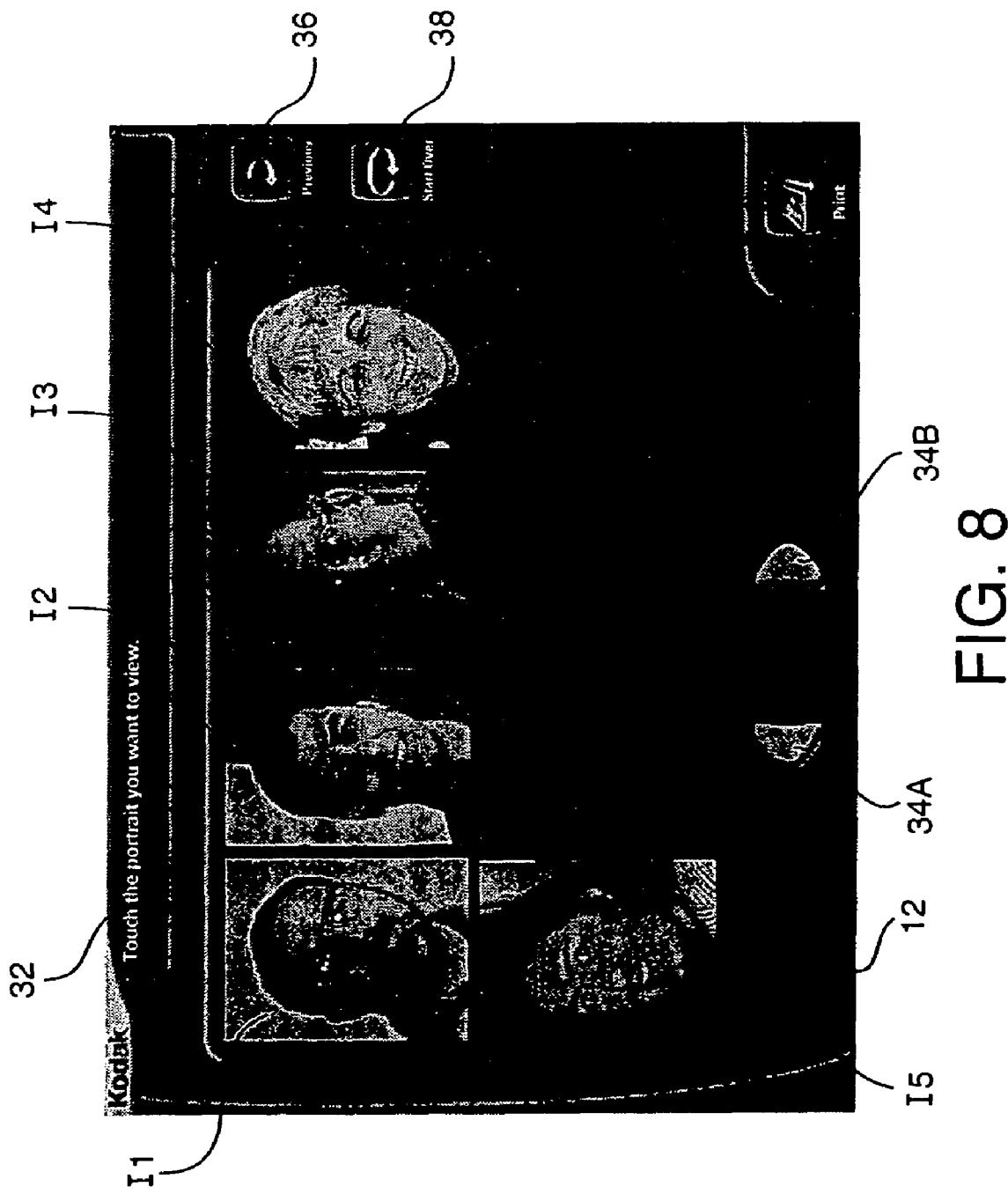
FIG. 8 shows a plurality of subjects detected from the digital still image of FIG. 5 in accordance with the method of FIG. 7.

At step 204, the detected subjects are displayed. FIG. 8 shows a plurality of subjects detected from digital still image 30. More specifically, FIG. 8 shows the 5 subjects of digital still image 30 detected using the subject detection algorithm. The 5 detected subjects are shown in FIG. 8 as subject images I1-I5. Each of subject images I1-I5 comprises one detected subject. These subject images I1-I5 are displayed on display 12.

Textual messages or instructional messages can also be displayed. For example, instructional message 32 is shown on display 12. Audio messages can also be provided.

At step 206, one of the displayed subject images I1-I5 is selected using a selection member. As indicated above, display 12 can be a touchscreen whereby portions of the screen can be touched to indicate a selection. For example, as shown in FIG. 8 by instructional message 32, any one of the subject images can be selected by touching. Accordingly, the selection member is the touchscreen. Alternatively, a highlight box or shadow box can circle one of the subject images, and selection members 34A, 34B configured as arrows can be used to cycle through the displayed subject images. FIG. 8 also shows selection members 36 and 38 that allow a user to "go back" and/or "start over". For the purposes of the instant example, subject image I3 is selected.

At step 208, a plurality of candidate images is displayed. Each of the candidate images comprises a template and the selected at least one of the plurality of subject images. More particularly, each candidate image includes a predetermined location where the selected subject image can be placed. The remaining portion of the candidate image comprises the template. The template of one candidate image differs from the template of another candidate image.

Figure 9:
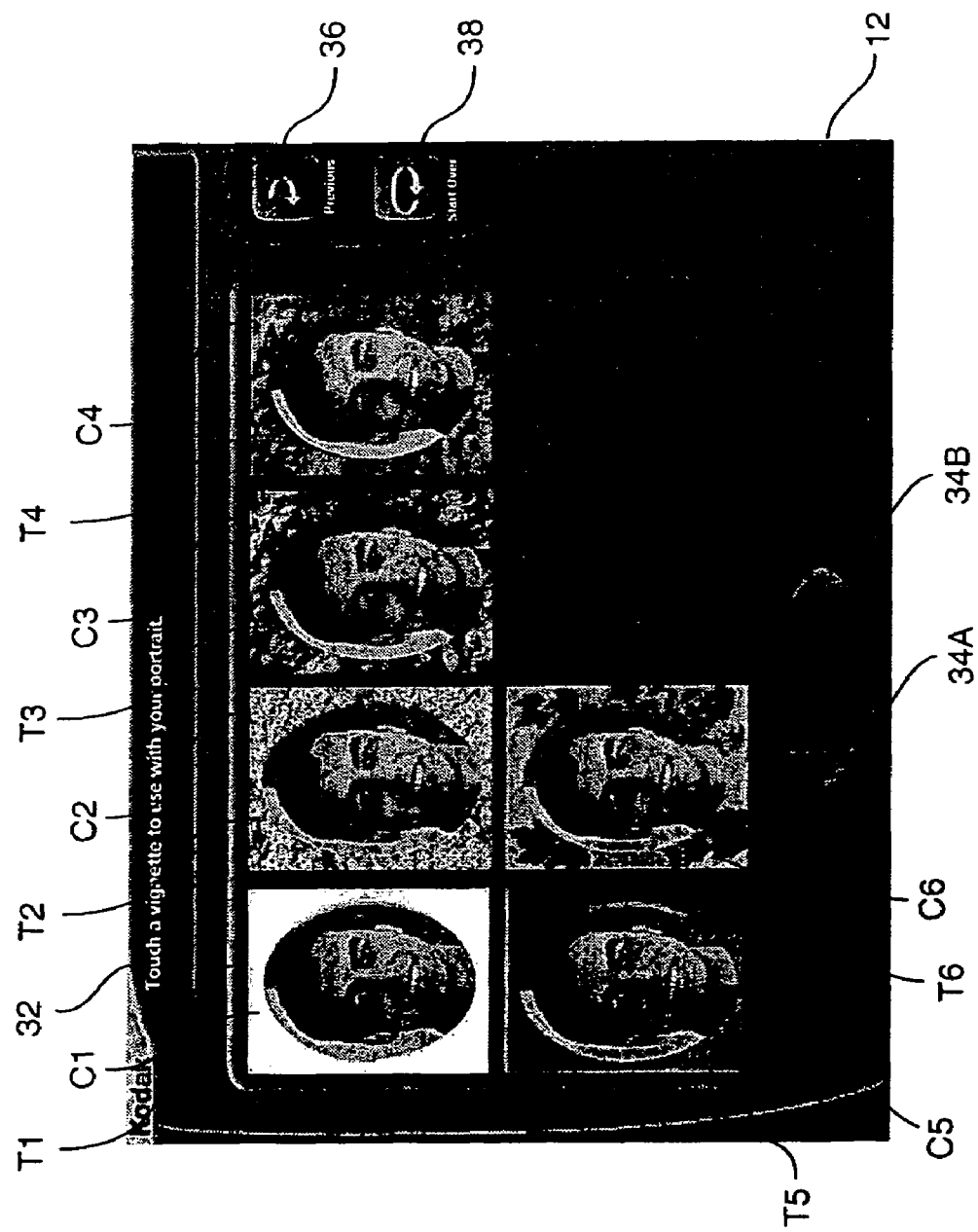
FIG. 9 shows a plurality of candidate images in accordance with the method of FIG. 7.

Referring now to FIG. 9, a plurality of candidate images C1-C6 is displayed in display 12. Each candidate image C1-C6 comprises the subject of the selected subject image, which for the instant example is subject image I2. Each candidate image C1-C6 also includes a template. The template for each displayed candidate image differs from another template. For the instant example, a template T1 of candidate image C1 is shown as a solid color. Template T1 differs from templates T2-T6 of candidate images C2-C6, respectively. The templates can vary in color, pattern, hue, color balance, contrast, wording, arrangement, and the like. For example, templates T1 and T5 are both of a solid color, but of a different color. Similarly, templates T2 and T3 comprise a floral pattern, but comprise flowers of different sizes. In addition, the predetermined location where the selected subject image can be placed is shown as an oval. This predetermined location can comprise another shape, such as a square, circle, star, non-uniform, rectangle, or the like. Further, different treatments can be applied to the candidate image and/or either or both the template and subject image. Examples of different treatments include, but are not limited to, sepia, brush stroke, pastel, monochrome, sponge, watercolor, plastic wrap, radial blur, smart blur, chalk and charcoal, photocopy, stamp, torn edges, and the like.

Combining the subject image with a pre-stored image (i.e., the template) is known to those skilled in the art. U.S. Pat. No. 6,075,542 (Fredlund) and U.S. Pat. No. 5,986,671 (Fredlund), both commonly-assigned and incorporated herein by reference, relate to methods of combining a digital image with a pre-stored digital image.

In one arrangement, the shape/size of the predetermined location is automatically determined based on the shape/size of the selected subject image. Yet further, templates T1-T6 are shown as vignettes, wherein a vignette is a picture that shades off into the surrounding color at the edges. Other arrangements can be employed, for example, a matted arrangement or a border. Other techniques can be employed, including, but not limited to edge obscuring, brush stroking, grain, dry brush, cutting, contrast, obscuring of the non-subject area, or de-emphasizing of the non-subject area such as by contrast or defocusing, feathering, or defocusing, or the like.

At step 210, one of the plurality of candidate images C1-C6 is selected. As indicated by instructional message 32 shown in FIG. 9, a selection member can be the touchscreen of display 12.

Figure 10:
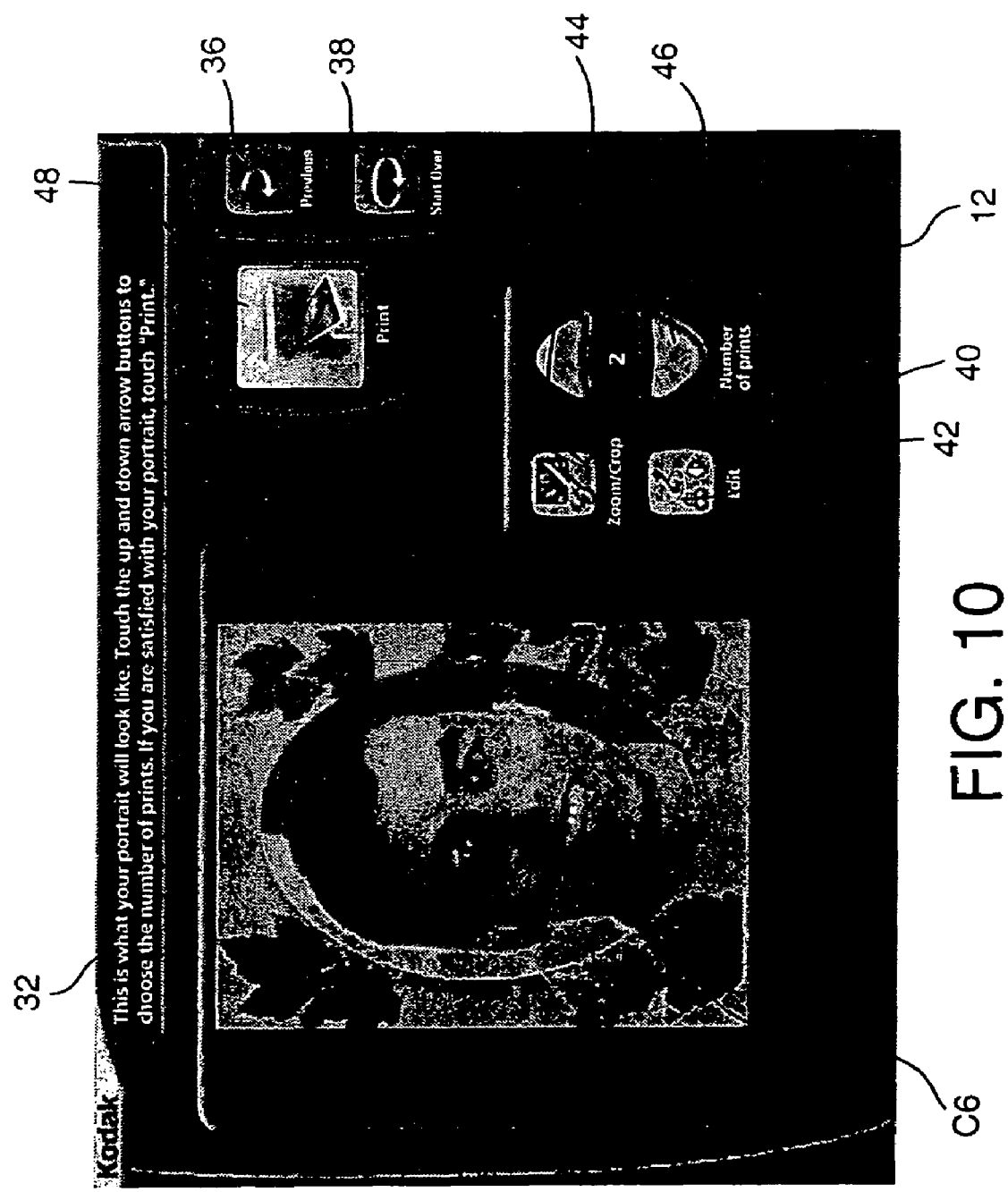
FIG. 10 shows a selected candidate image in accordance with the method of FIG. 7.

Once one of the candidate images C1-C6 is selected, the selected candidate image is displayed on display 12 (step 212). For the instant example, candidate image C6 is touched in FIG. 9. In response to selecting candidate image C6 in FIG. 9, display 12 displays solely the selected candidate image C6 (i.e., the non-selected candidate images are not displayed), as shown in FIG. 10. Textual information can be added to the selected candidate image (whether on the template or the subject image), for example, to identify the subject or to provide a message, such as "Happy Birthday".

A user is now able to more particularly view the selected candidate image.

In a preferred embodiment, a menu is provided to allow the user to modify the image or generate an order for an image bearing product comprising the image. In FIG. 10, a menu 40 is provided proximate the displayed selected candidate image C6. Menu 40 can include an edit selection member 42 adapted to initiate editing of the selected candidate image. Such edits can include removal of red-eye, color balancing, artifact removal, autofill, autoscale, add text, change contrast, sepia, zoom/crop, sharpening, noise removal, and the like. Further, edit selection member 42 might be employed to translate/rotate the selected subject image within the predetermined location. Menu 40 can also include a zoom/crop selection member 44 adapted to initiate zooming/cropping of the selected image to generate a modified candidate image; such zooming/cropping being features well known to those skilled in the art. Still further, menu 40 can include an order menu 46 adapted to receive an image order for the selected candidate images. Alternatively, display 12 can include a print selection member 48 adapted to initiate the printing of a hardcopy output of the selected candidate image. Still further, selection members can be provided to allow the storing or transmitting of the selected (or edited/modified) candidate image.

When the plurality of subject images are displayed, it may be desirable to have the subject images arranged by category. For example, with reference to FIG. 6, it might be desired to display the men proximate each other, and display the men proximate each other. As such, the content of each of the subject images can be determined and categorized (e.g., gender, human/non-human, size, animate/inanimate, age, baby/child/adult, height, weight, hair color, eye color, facial expression, eyes open/closed) whereby the plurality of subject images would be displayed by category. The subject images within a particular category can be displayed proximate each other, with different screens showing different categories. Further, the templates can be provided in accordance with the category. For example, if the content is determined to be a baby, a template comprising items associated with a baby (rattle, bottle, stuffed animal) can be employed. Similarly, if the content is determined to be a child, a template having a juvenile theme can be provided.

Third Embodiment

A third embodiment of the present invention is now disclosed providing another arrangement wherein a single subject is extracted from an image and merged with a single template.

Figure 11:
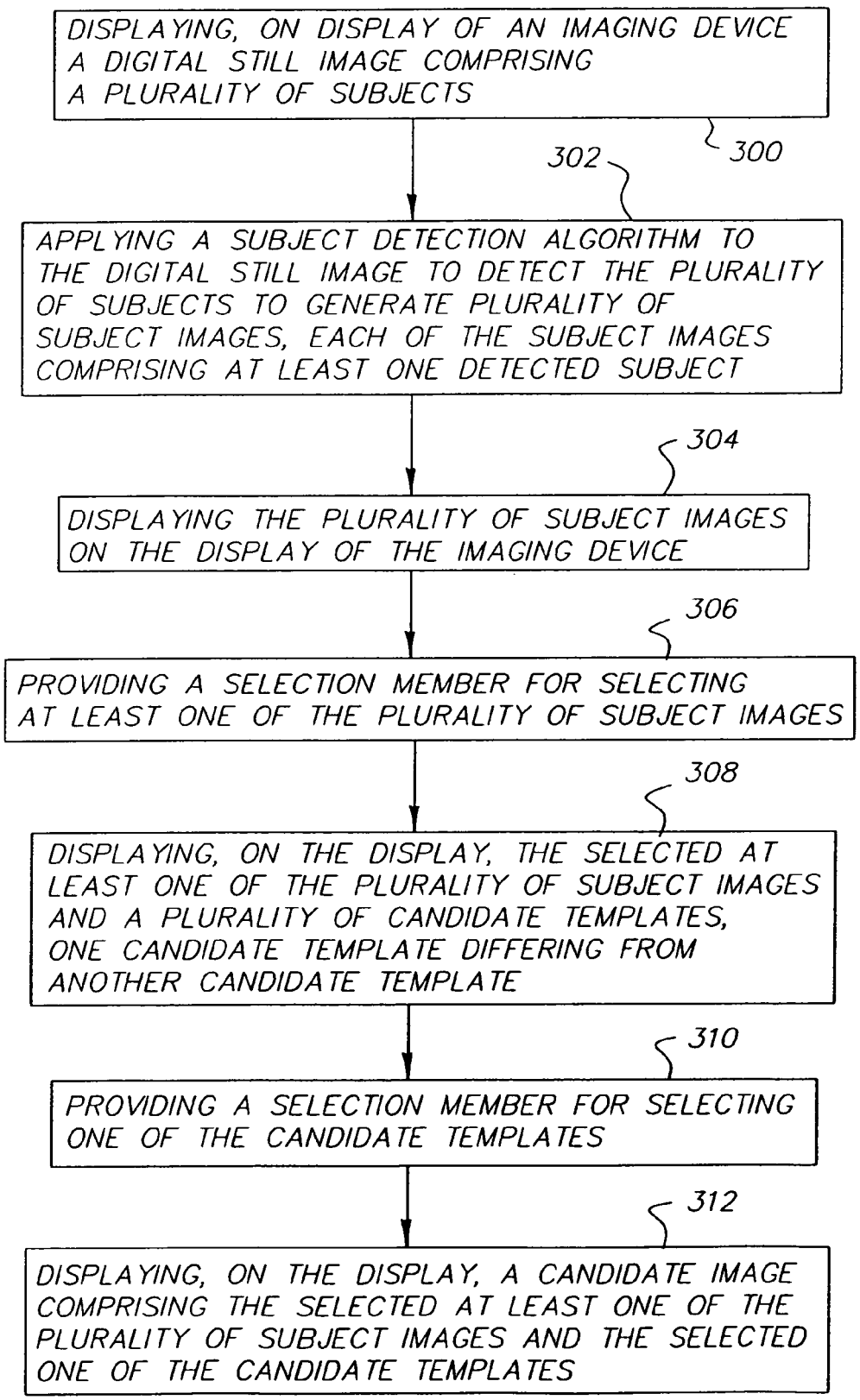
FIG. 11 shows a flow diagram of a method in accordance with a third embodiment of the present invention.

FIG. 11 shows a flow diagram of a method for generating an image in accordance with a third embodiment of the present invention. Steps 300-306 mirror steps 200-206 disclosed in FIG. 7. That is, at step 300, a digital still image comprising a plurality of subjects is displayed on display 12 of kiosk 10. A subject detection algorithm is applied to the digital still image to detect the plurality of subjects and generate a plurality of subject images, wherein each of the subject images comprises at least one detected subject (step 302). At step 304, each of the plurality of subject images is displayed on display 12 of kiosk 10. Kiosk 10 includes a selection member for selecting at least one of the plurality of subject images (step 306).

At step 308, a plurality of candidate templates is displayed on display 12 along with the selected at least one of the plurality of subject images. Each candidate template differs from another candidate template. One of the plurality of candidate templates is then selected using a selection member of kiosk 10 (step 310), and the selected one of the plurality of candidate templates is merged with the selected at least one of the plurality of subject images to generate a candidate image. This candidate image is displayed on display 12 at step 312. The displayed candidate image can then be stored, transmitted, or printed, if desired.

The steps of the method diagrammed in FIG. 11 are now more particularly described with reference to an example employing FIGS. 5 and 12-14.

Figure 5:
FIG. 5 shows a digital still image displayed in a display of the kiosk.
Figure 6:
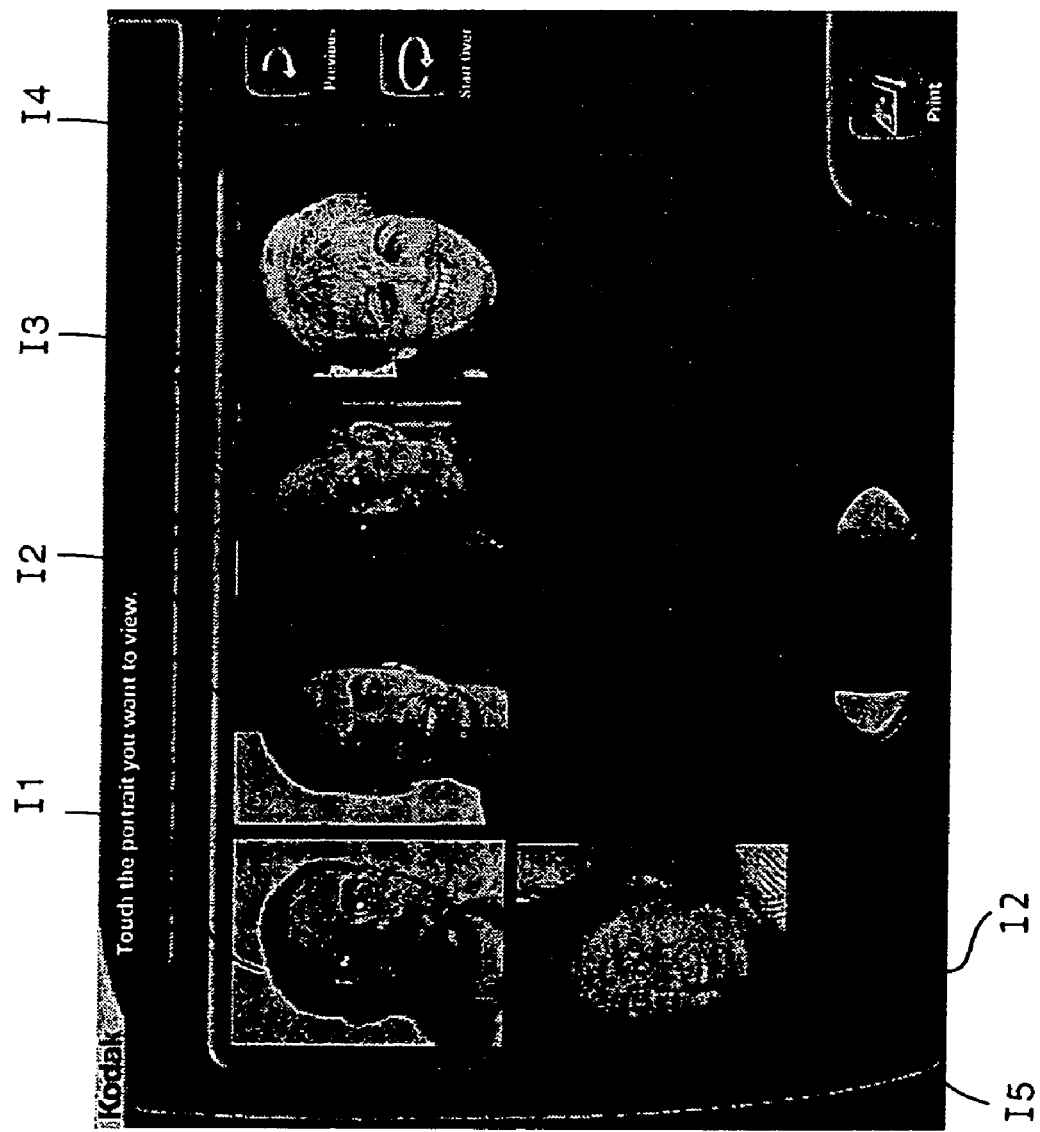
FIG. 6 shows a plurality of subjects detected from the digital still image of FIG. 5 in accordance with the method of FIG. 4.

Regarding step 300, FIG. 5 shows digital still image 30 displayed on display 12 a plurality of 5 subjects, more specifically, 5 adults. At step 302, the subject detection algorithm is applied to digital still image 30 to detect the 5 subjects of digital still image 30 and generate a plurality of subject images. These subject images are displayed on display 12 (step 304), as shown in FIG. 12.

Figure 12:
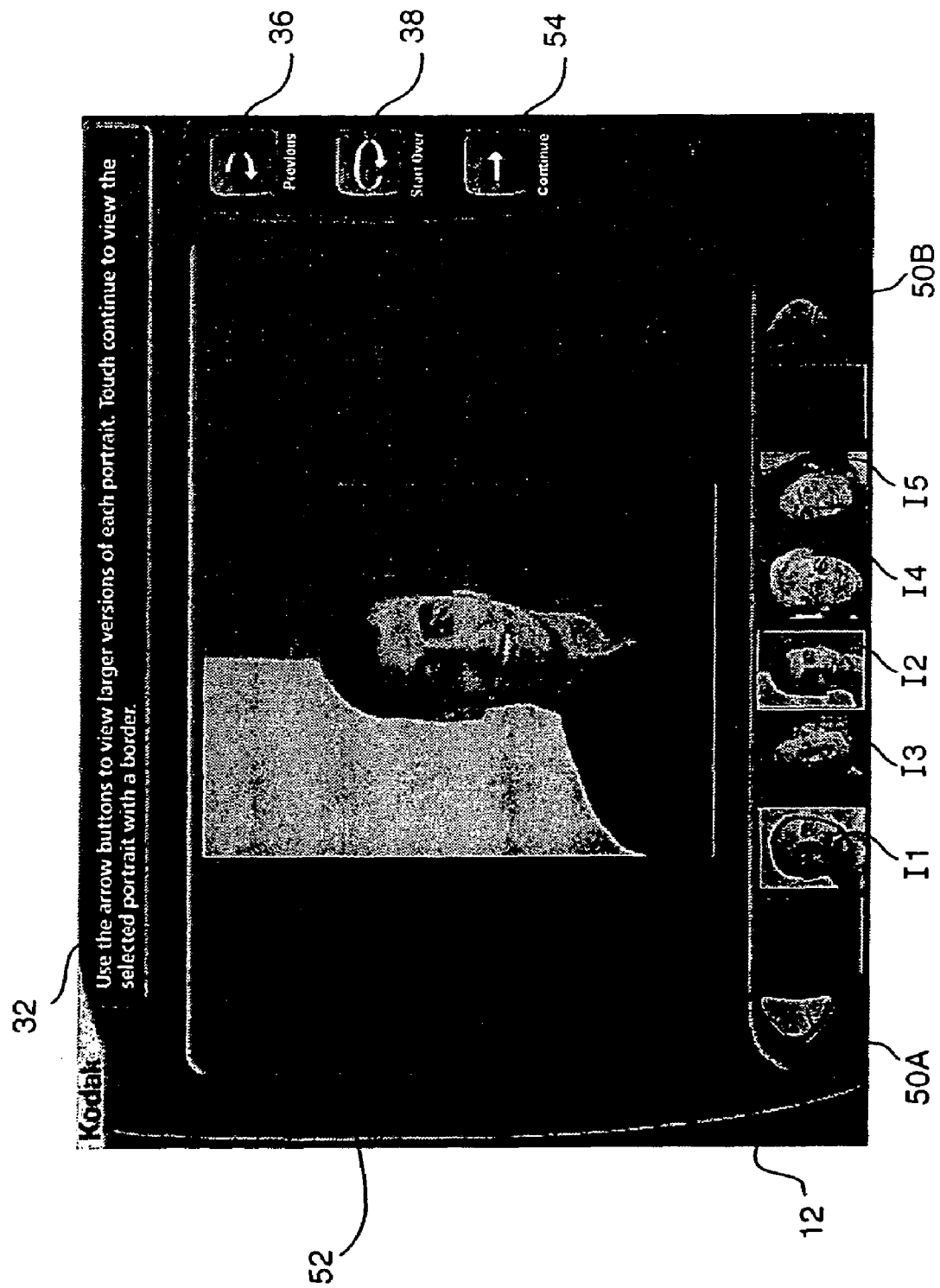
FIG. 12 shows a plurality of subjects detected from the digital still image of FIG. 5 in accordance with the method of FIG. 11.

In FIG. 12, the plurality of subject images are displayed as subject images I1-I5 (step 304). However, the plurality of subject images I1-I5 are shown in a linear arrangement wherein selection members 50A, 50B, configured as arrows, can be touched to select one of the displayed subject images (step 306). A shadow box or highlight box can be employed to indicate which subject image (of the linear arrangement) is currently selected. FIG. 12 shows subject image I2 as having a shadow box encircling the image. Alternatively, or in addition to, the selected subject image can be displayed in a larger format preview area proximate the linear arrangement of the subject images. As shown in FIG. 12, a preview area 52 displays subject image I2. Once the desired subject image is selected, a continue selection member 54 is selected to indicate the selection and continue with the method.

Figure 13:
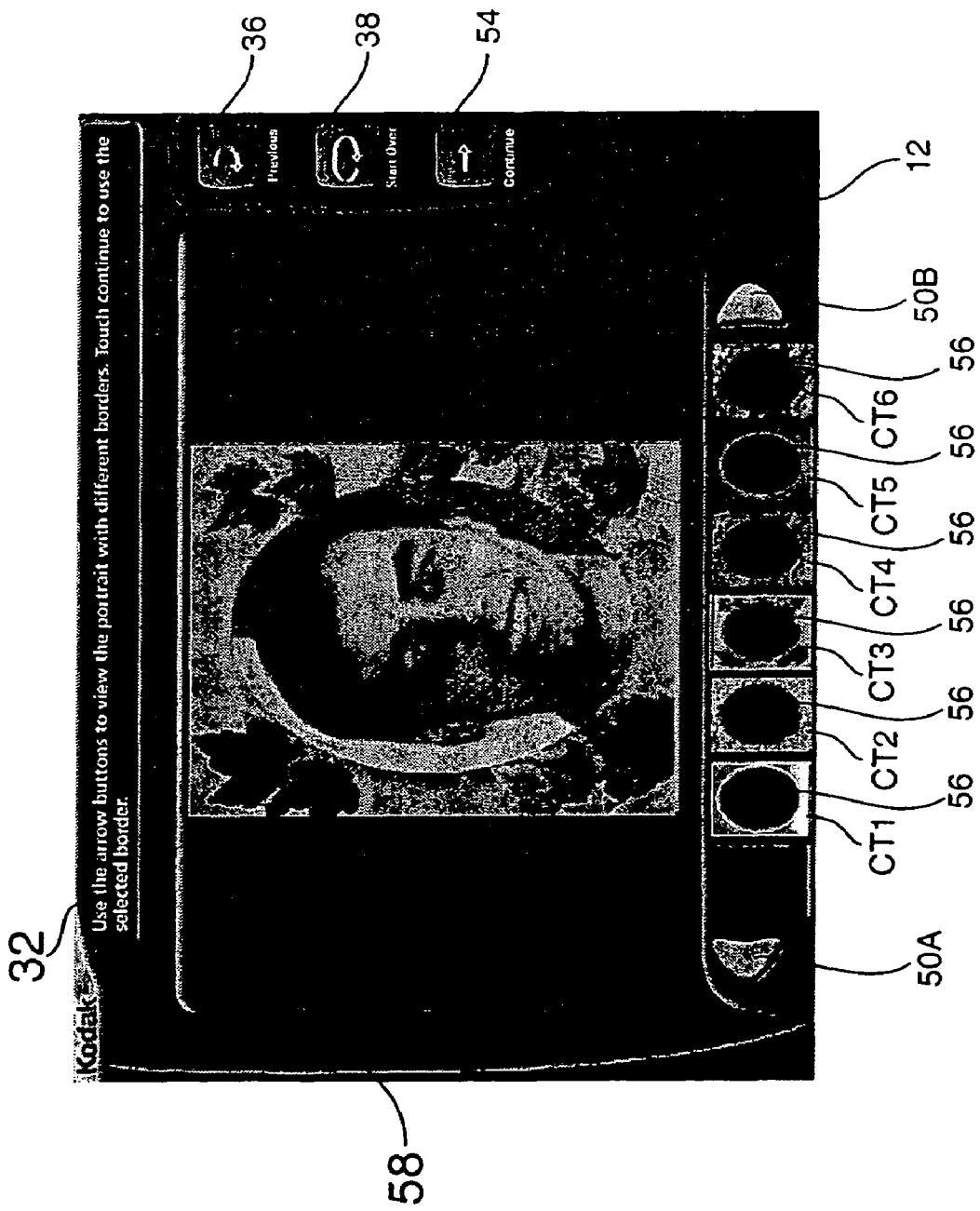
FIG. 13 shows a plurality of candidate templates in accordance with the method of FIG. 11.

At step 308, the selected subject image is displayed along with a plurality of candidate templates. Referring now to FIG. 13, disposed in a linear arrangement, is a plurality of candidate templates CT1-CT6. Each candidate template includes a predetermined location 56 wherein the selected subject image can be placed. Selection members 50A, 50B, configured as arrows, can be touched to select one of the displayed candidate templates and/or to view additional candidate templates (step 310). Each candidate template differs from another displayed candidate template.

Disposed proximate the plurality of candidate templates CT1-CT6 is a candidate image preview area 58. Disposed within candidate image preview area 58 is a candidate image comprising the selected at least one of the plurality of subject images and a selected one of the candidate templates. That is, the previously selected subject image is positioned within the predetermined location 56 of whichever candidate template is selected by the user. For the instant example, subject image I2 was selected in FIG. 12, and candidate template CT3 has a shadow box surrounding the template in the linear arrangement indicating its selection (FIG. 13). Therefore, a candidate image disposed in preview area 58 comprises subject image I2 and candidate template CT3. Similarly, if arrow 50A was pressed twice to select CT1, then a candidate image disposed in preview area 58 would comprise subject image I2 disposed in the predetermined location 56 of candidate template CT1. Various combinations of the selected subject image and candidate templates can be previewed.

Figure 14:
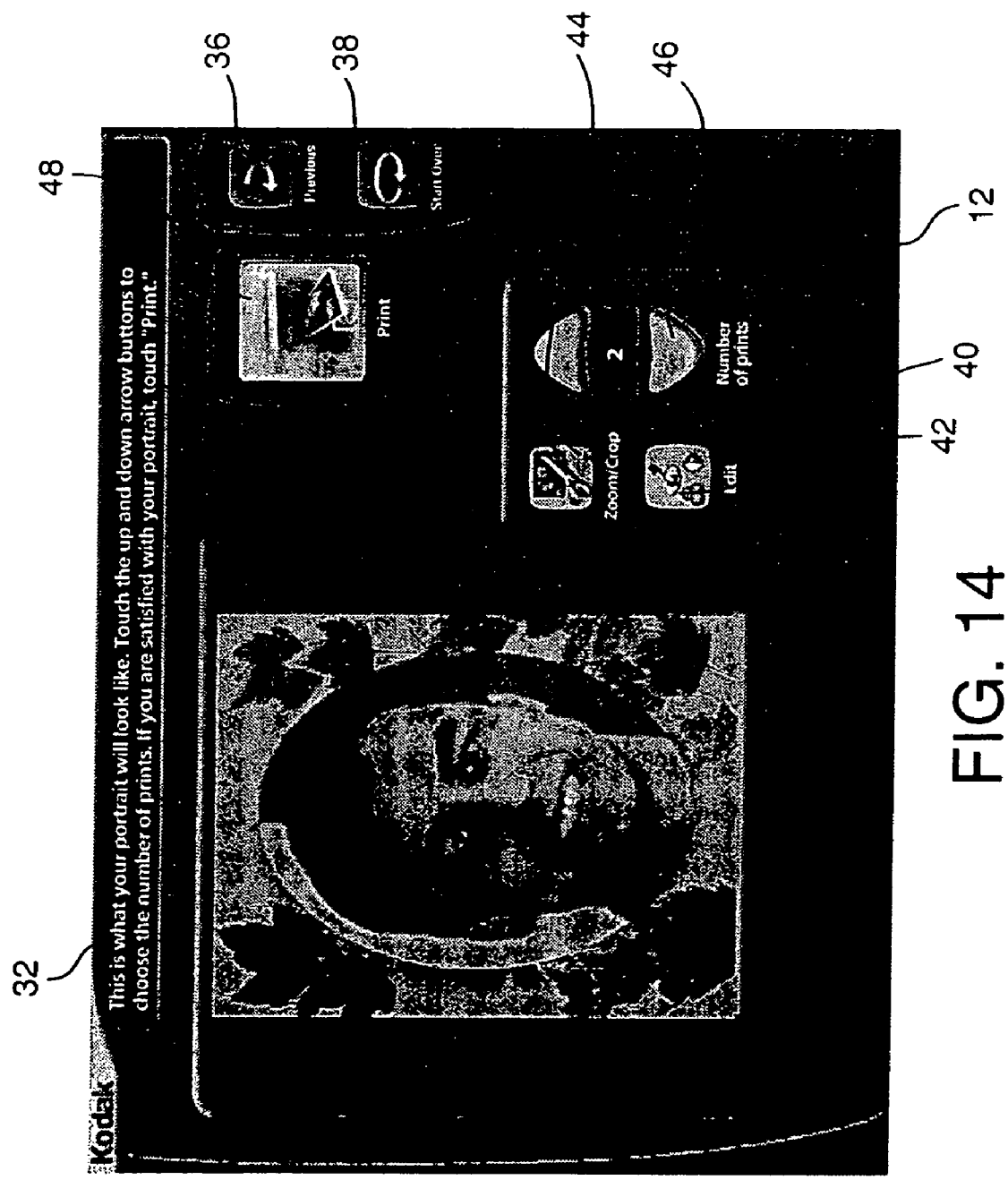
FIG. 14 shows a selected candidate image in accordance with the method of FIG. 11.

Once the desired candidate image is displayed in preview area 58 (i.e., the desired combination of subject image and candidate template is selected), as shown in FIG. 13, continue selection member 54 is selected to indicate the final selection and continue with the method. Thereafter, the selected candidate image is displayed in display 12. As shown in FIG. 14, menu 40 can be displayed to provide for the features of editing, zoom/crop, order entry, and printing (e.g., edit selection member 42, zoom/crop selection member 44, order menu 46, and print selection member 48). Still further, selection members can be provided to allow the storing or transmitting of the selected (or edited/modified) candidate image.

Fourth Embodiment

The present invention is not limited to one subject and/or one template. A fourth embodiment of the present invention is now disclosed wherein a plurality of subjects are positioned within a plurality of templates.

A user may desire to select two or more subject images to be positioned within two or more templates. Accordingly, it may be required that the user indicates the number of subject images to be selected, as well as indicate the number of templates to be selected. If the user first indicates the number of subject images, the number of templates can correspond. If the user first indicates the number of templates, the number of subject images can correspond.

Figure 15:
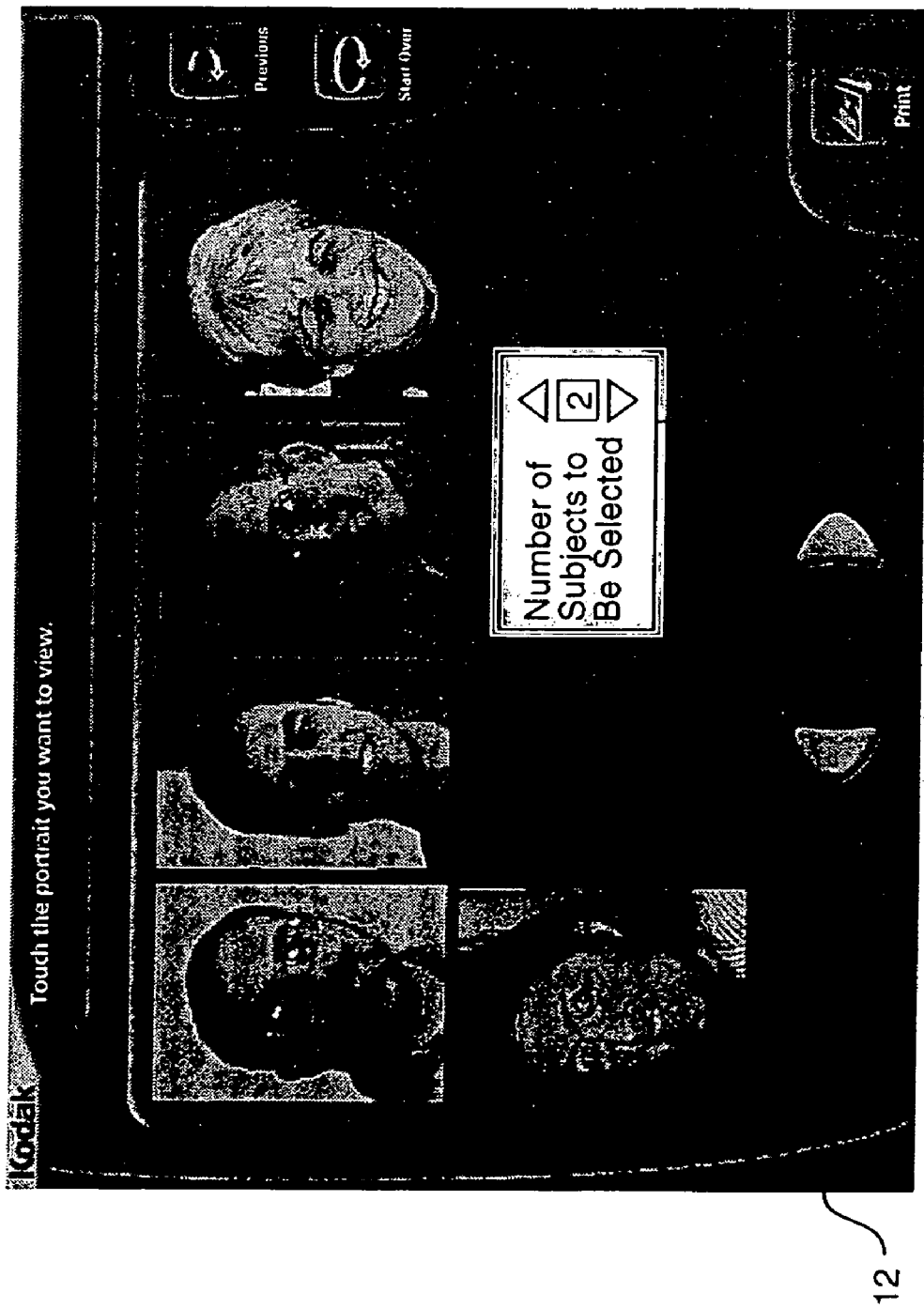
FIG. 15 shows a plurality of subjects detected from the digital still image of FIG. 5 in accordance with a fourth embodiment wherein a plurality of subjects are selected.
Figure 16:
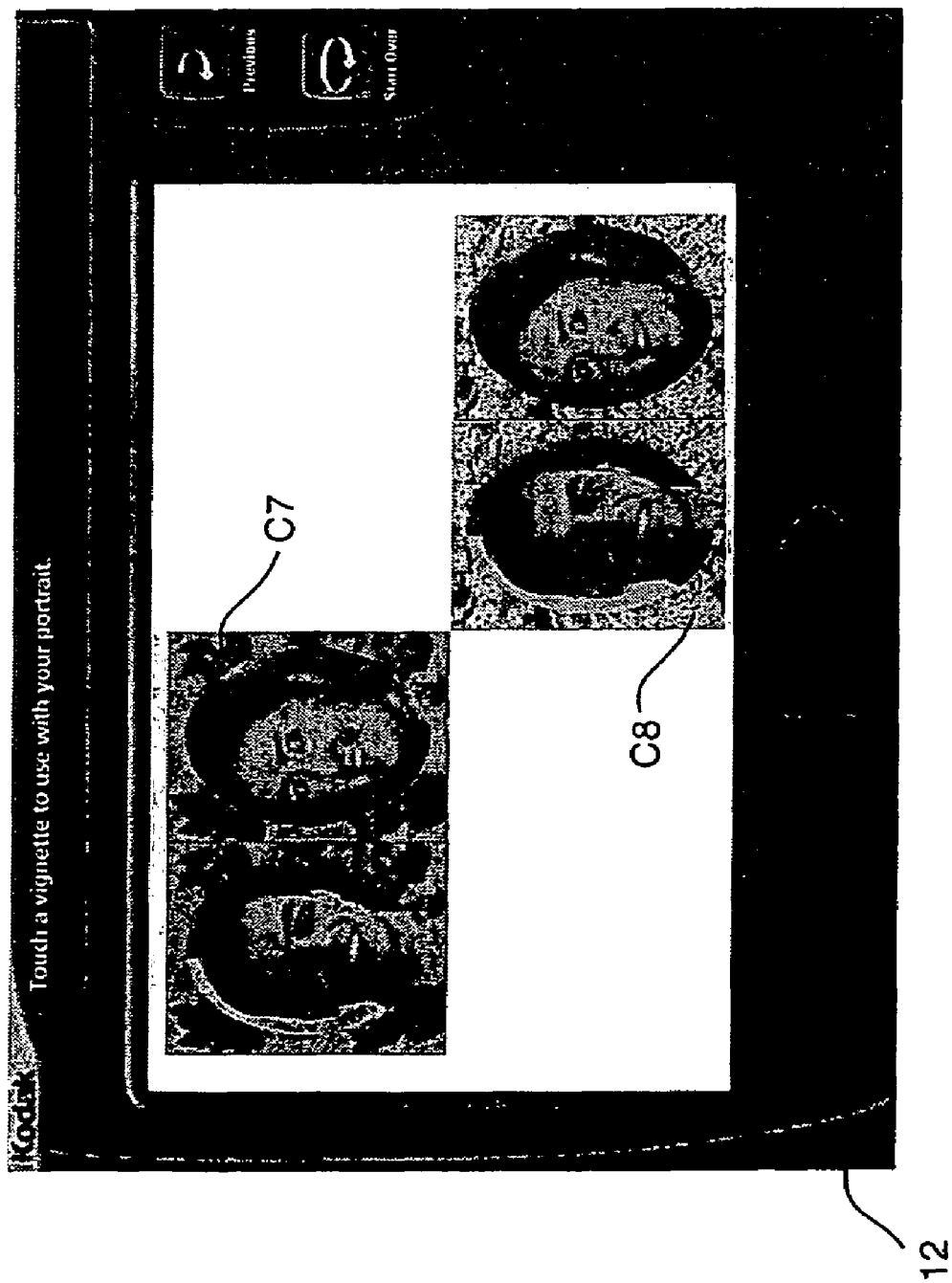
FIG. 16 shows a plurality of candidate images in accordance with a fourth embodiment wherein a plurality of subjects were selected in FIG. 15.

For example, referring to FIGS. 5 and 15-16, display 12 can display a subject number menu 60 allowing a user to indicate how many subjects are to be selected. In the instant example shown in FIG. 15, the number 2 is indicated, indicating that two subject images are to be selected. Accordingly, once the two subject images are selected, a plurality of candidate images can be displayed for selection by the user. FIG. 16 shows two candidate images C7 and C8 displayed for selection by a user. Each of the two candidate images is formed by disposing the subject images/template adjacent each other to form a single image.

Figure 17:
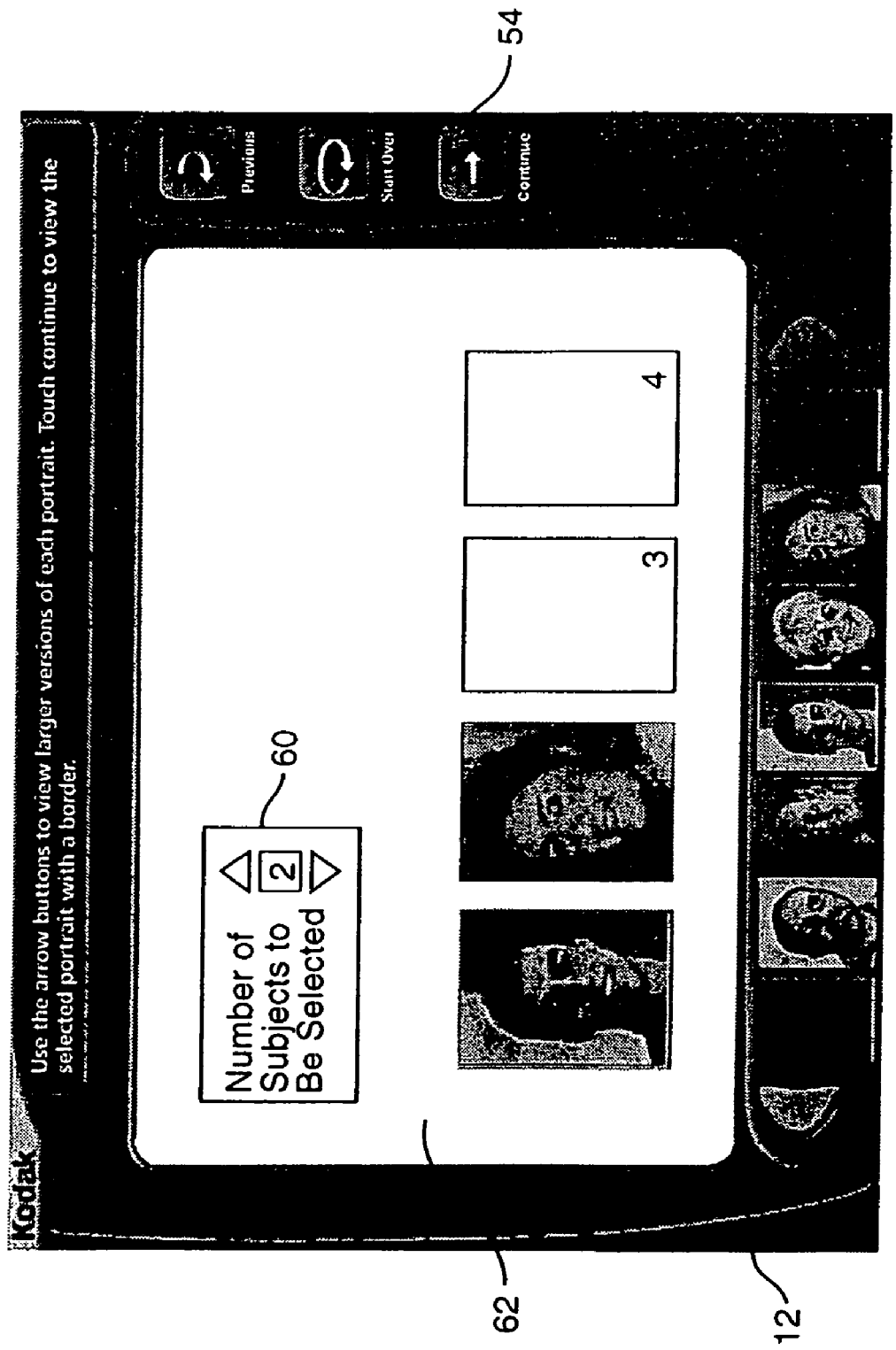
FIG. 17 shows a plurality of subjects detected from the digital still image of FIG. 5 in accordance with a fourth embodiment wherein a plurality of subjects are selected.
Figure 18:
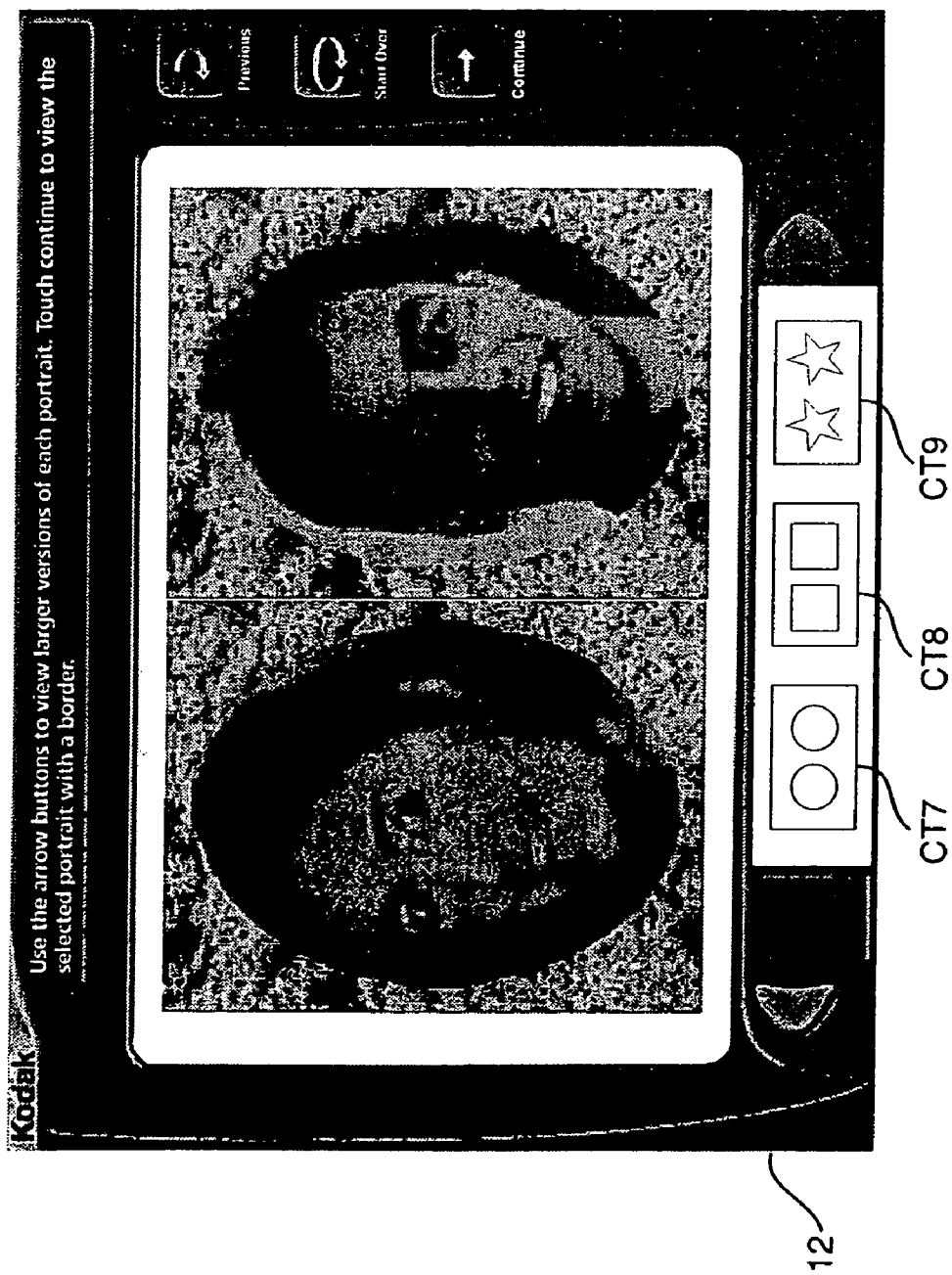
FIG. 18 shows a plurality of candidate templates in accordance with a fourth embodiment wherein a plurality of subjects were selected in FIG. 17.

Alternatively, referring to FIGS. 5 and 17-18, display 12 can display subject number menu 60 allowing a user to indicate how many subjects are to be selected, and then displaying in a preview area 62 the selected subject images. Then, once continue selection member 54 is selected, a plurality of candidate templates can be displayed for selection by the user. FIG. 18 shows a plurality of candidate templates CT7-CT9 comprising the same number of predetermined locations as there are selected number of subjects. For the instant example, each candidate template shown in FIG. 18 has two predetermined locations since menu 60 indicated that two subject images were selected. Accordingly, if menu 60 indicated that 5 subject images were to be selected, each candidate template would comprise 5 predetermined locations. The candidate templates can be selected, whereby a candidate image is shown on display 12. It is noted that the predetermined locations, within one candidate template, can be of varying sizes and/or shapes.

Fifth Embodiment

A fifth embodiment of the present invention is now disclosed wherein a plurality of subjects and one template are employed.

It may be desirable to form a photo collage comprising some or all of the subjects of digital still image. A method in accordance with a fifth embodiment of the present invention provides for the generation of such a photo collage.

Figure 19:
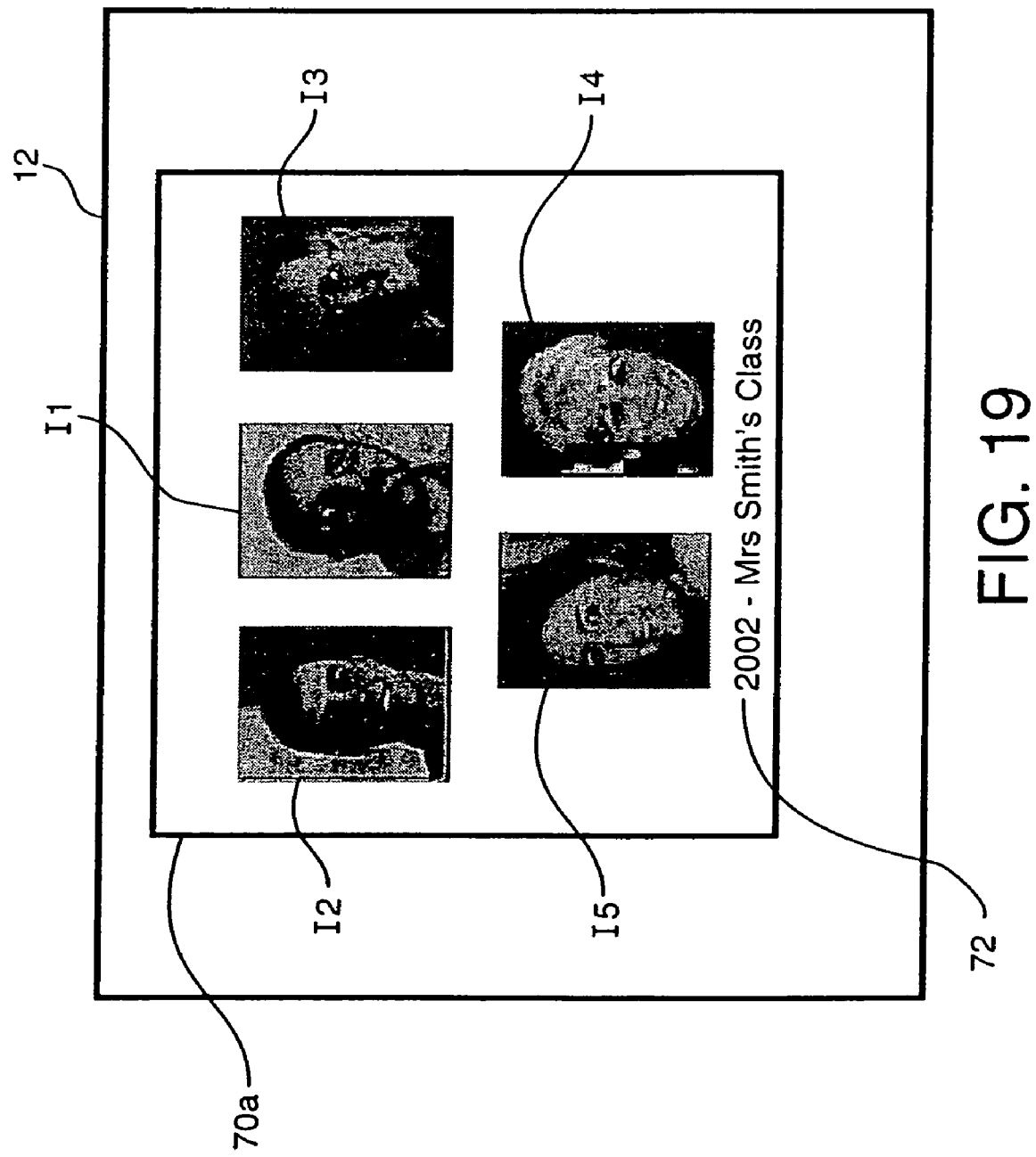
FIG. 19 shows a first photo collage generated using a method in accordance with the present invention.

For example, digital still image 30 shown in FIG. 5 could be a school picture. It might be desirable to form a photo collage from digital still image 30. FIG. 19 shows a first arrangement of a photo collage 70a displayed on display 12 comprising subject images I1-I5.

Referring to FIGS. 5 and 19, photo collage 70a is generated by accessing digital still image 30 comprising the plurality of subjects. Then, a subject detection algorithm is applied to digital still image 30 to detect the plurality of subjects to generate the plurality of subject images I1-I5, each of subject images I1-I5 comprising one detected subject. Photo collage 70a is formed comprising the plurality of subject images I1-I5, and photo collage 70a is displayed on display 12, as shown in FIG. 19. Textual information 72 can be included on the photo collage. Once displayed, photo collage 70a can be stored, transmitted, or printed.

Photo collage 70a is formed by arranging the plurality of subject images in a predetermined layout. Various predetermined layouts that are pleasing and artistic will be known to those skilled in the art. For FIG. 19, for 5 subject images, the predetermined layout is configured as a linear arrangement of 3 of the subject images proximate a linear arrangement of 2 of the subject images.

The content of each of the subject images can be categorized, and the plurality of subject images arranged in the predetermined layout in accordance with the categorization of the subject images. For example, for FIG. 19, the content of the 5 subject images is determined to be 3 men and 2 women. Accordingly, the predetermined layout shown in FIG. 19 grouped the men and the women.

Figure 20:
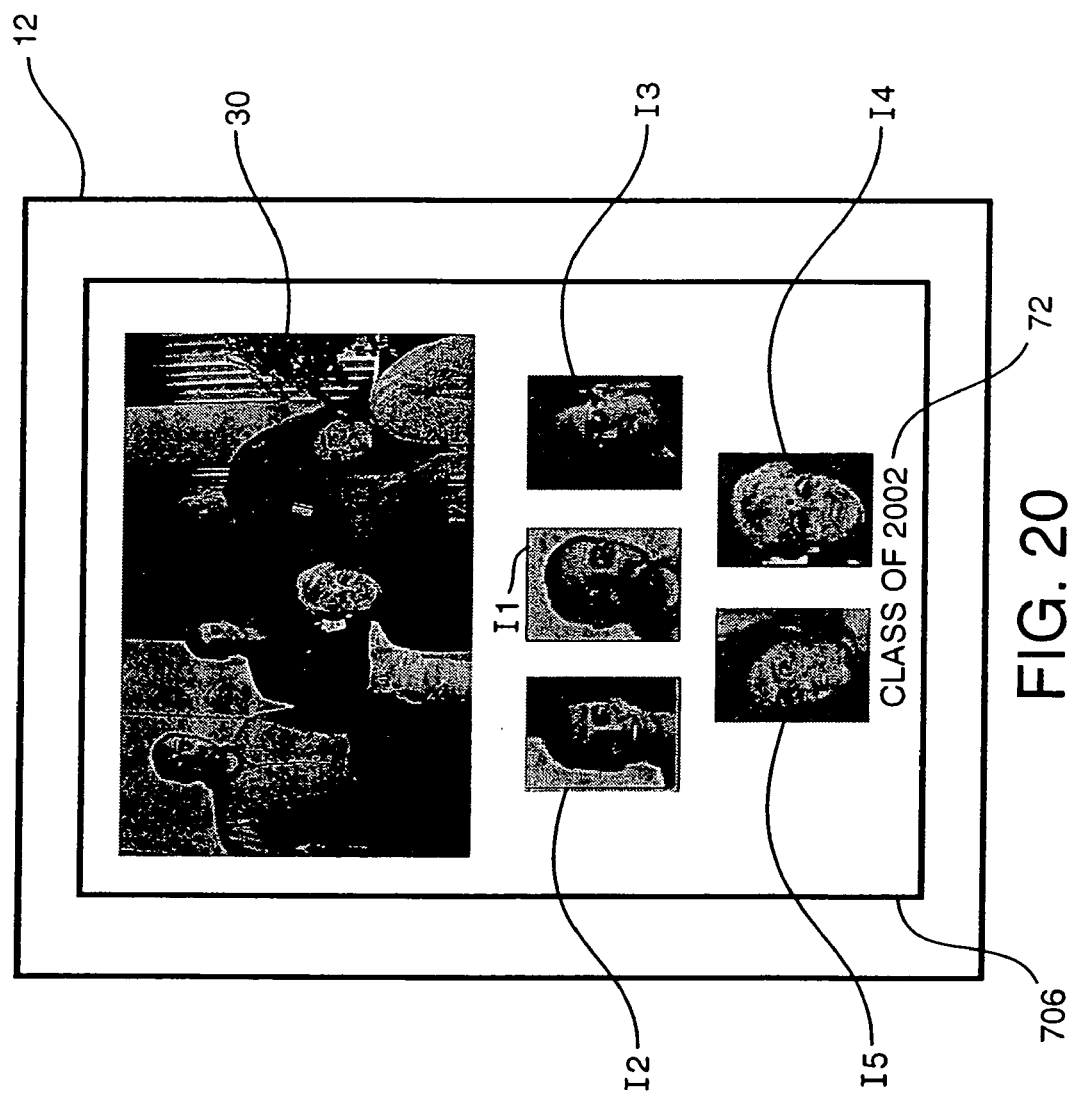
FIG. 20 shows a second photo collage generated using a method in accordance with the present invention.

The photo collage can also comprise the digital still image. FIG. 20 shows photo collage 70b comprising the plurality of subject images I1-I5 and digital still image 30.

Sixth Embodiment

A sixth embodiment of the present invention is now disclosed wherein a plurality of subjects and one template are employed. More specifically, it may be desirable to form a photo collage wherein each of the subject images includes a template. A method in accordance with a sixth embodiment of the present invention provides for the generation of such a photo collage.

Figure 21:
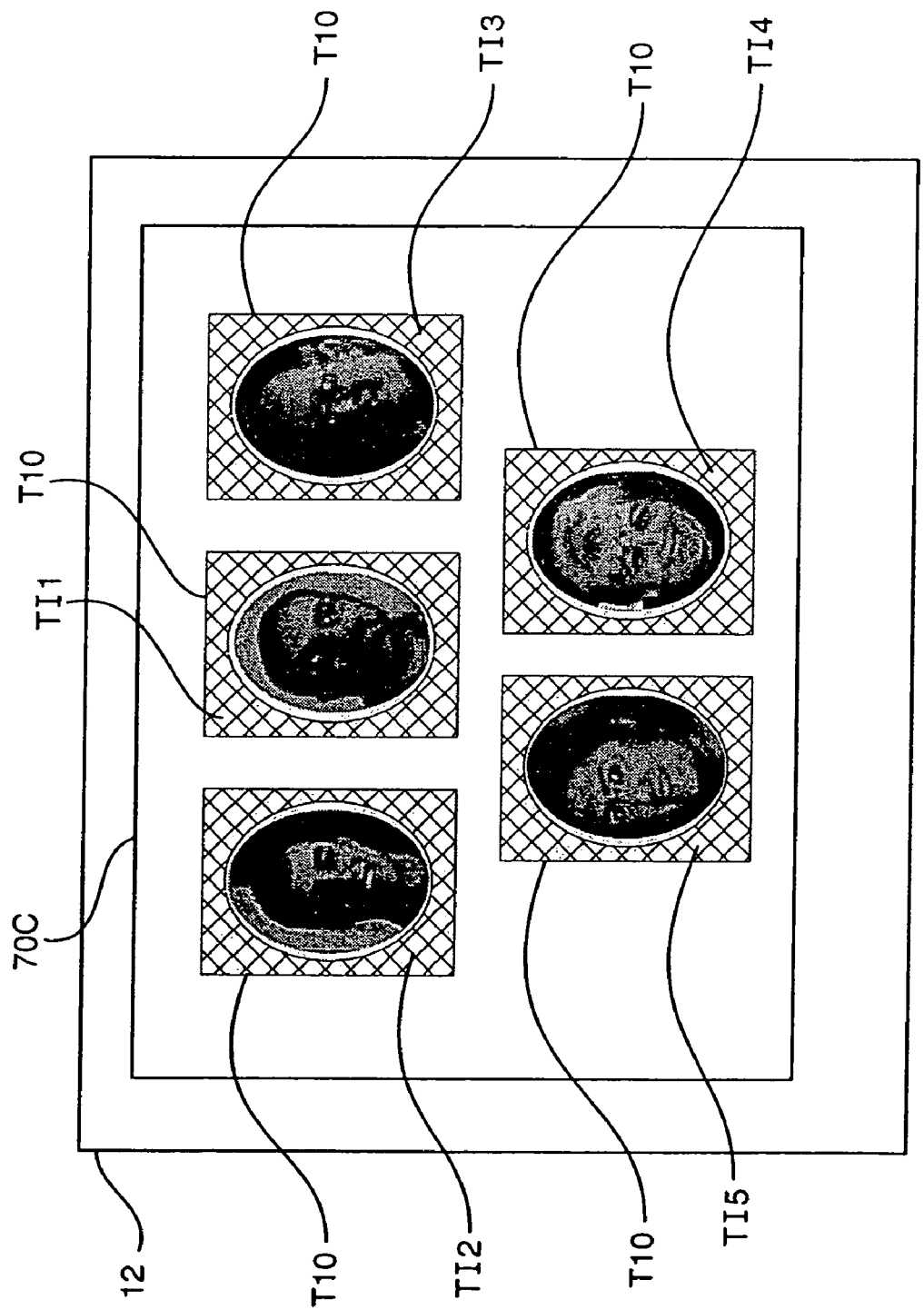
FIG. 21 shows a third photo collage generated using a method in accordance with the present invention.

FIG. 21 shows an arrangement of a photo collage 70c displayed on display 12 wherein a template is employed with each of subject images I1-I5. More particularly, referring to FIGS. 5 and 21, digital still image 30 is accessed and a subject detection algorithm is applied to digital still image 30 to detect the plurality of subjects to generate a plurality of subject images, each of the subject images comprising at least one detected subject. A template T10 is provided, wherein template T10 has a predetermined location adapted to receive one of the plurality of subject images I1-I5. A plurality of template images T11-T15 are generated wherein each of the template images comprises the template and one of the plurality of subject images disposed within the predetermined location. Photo collage 70c is formed comprising the plurality of template images T11-T15, as shown in FIG. 21, and displayed on display 12. Once displayed, photo collage 70c can be stored, transmitted, or printed.

In addition, the individual template images can be individually printed. That is, the system can extract each template image for separate storage, transmittal, or printing. As such, each individual template might be considered a "trading card" or "snap shot" for sharing with friend and/or relatives. An example is a photo collage of a baseball team, wherein the individual template images would provide a trading card of each player for sharing with team-mates.

Photo collage 70c is formed by arranging the plurality of template images in a predetermined layout. Various predetermined layouts, which are pleasing and artistic will be known to those skilled in the art. For FIG. 21, for 5 subject images, the predetermined layout is configured as a linear arrangement of 3 of the subject images proximate a linear arrangement of 2 of the subject images.

The content of each of the template images can be categorized, and the plurality of template images arranged in the predetermined layout in accordance with the categorization of the template images. For example, for FIG. 21, the content of the 5 template images is determined to be 3 men and 2 women. Accordingly, the predetermined layout shown in FIG. 21 grouped the men and the women.

Figure 22:
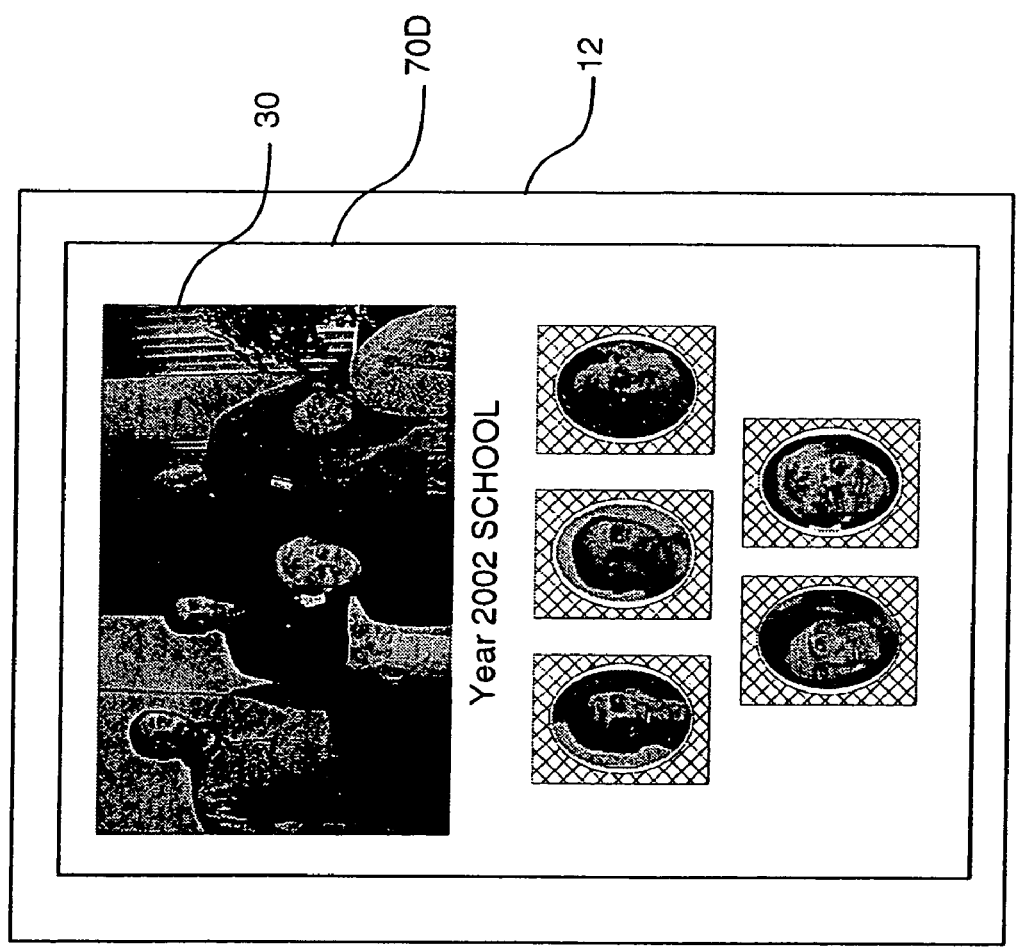
FIG. 22 shows a fourth photo collage generated using a method in accordance with the present invention.

The photo collage can also comprise the digital still image. FIG. 22 shows photo collage 70d comprising the plurality of template images T11-T15 and digital still image 30.

Textual information can be included on the photo collage.

Seventh Embodiment

A seventh embodiment of the present invention is now disclosed wherein a plurality of subjects and a plurality of templates are employed. More specifically, it may be desirable to form a photo collage wherein each of the subject images includes a template. However, it may be desired to have more than one template. A method in accordance with a seventh embodiment of the present invention provides for the generation of such a photo collage.

Figure 23:
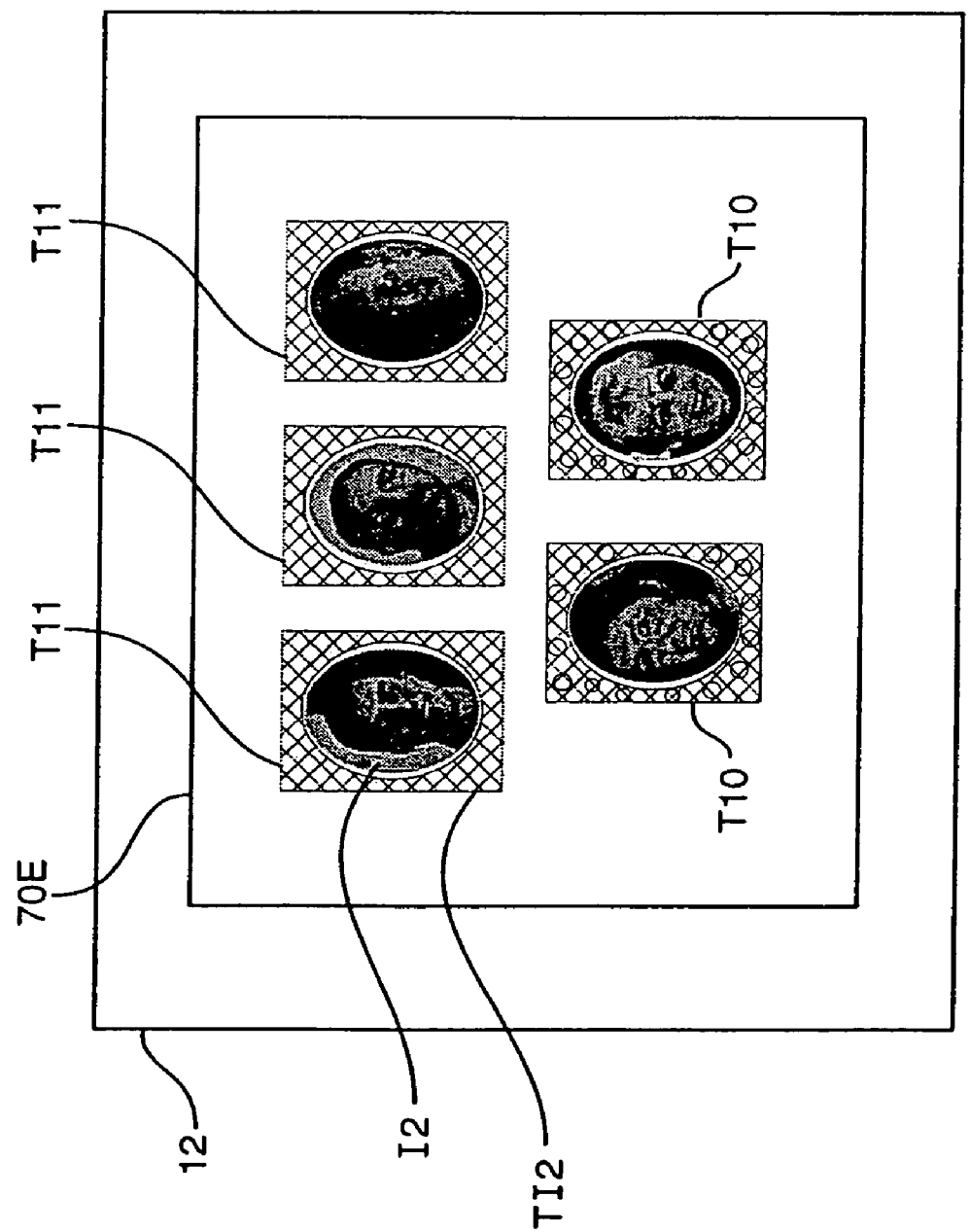
FIG. 23 shows a fifth photo collage generated using a method in accordance with the present invention.

Referring to FIGS. 5 and 23, digital still image 30 is accessed and a subject detection algorithm is applied to digital still image 30 to detect the plurality of subjects to generate a plurality of subject images, each of the subject images comprising at least one detected subject. A first template T10 and second template T11 are provided, wherein each of the first and second templates has a predetermined location adapted to receive one of the plurality of subject images I1-I5. The content of each of the plurality of subject images is categorized. For digital still image 30, the content can be categorized by men/women, finding that subject images I1, I2, and I3 are men, and subject image I4 and I5 are women. (Other categorization may be known to those skilled in the art for digital still image 30.) The templates are associated with each of the plurality of subject images in accordance with the categorization. For this example, first template T10 is associated with each of the "women" subject images and second template T11 is associated with each of the "men" subject images. A plurality of template images are generated wherein each template image comprises the one of the plurality of subject images and the associated template and the one of the plurality of subject images is disposed within the predetermined location of the associated template. For example, template image T12 is comprised of associated second template T11 and subject image I2. Photo collage 70e is formed of the plurality of template images, and displayed on display 12. Once displayed, photo collage 70e can be stored, transmitted, or printed.

Photo collage 70e is formed by arranging the plurality of template images in a predetermined layout. Various predetermined layouts, which are pleasing and artistic, will be known to those skilled in the art. For FIG. 23, for 5 subject images, the predetermined layout is configured as a linear arrangement of 3 of the subject images proximate a linear arrangement of 2 of the subject images. This predetermined layout also corresponds with the categorization, and accordingly the grouping of first and second templates T10, T11. That is, the plurality of template images is arranged in the predetermined layout in accordance with the categorization of the template images.

Figure 24:
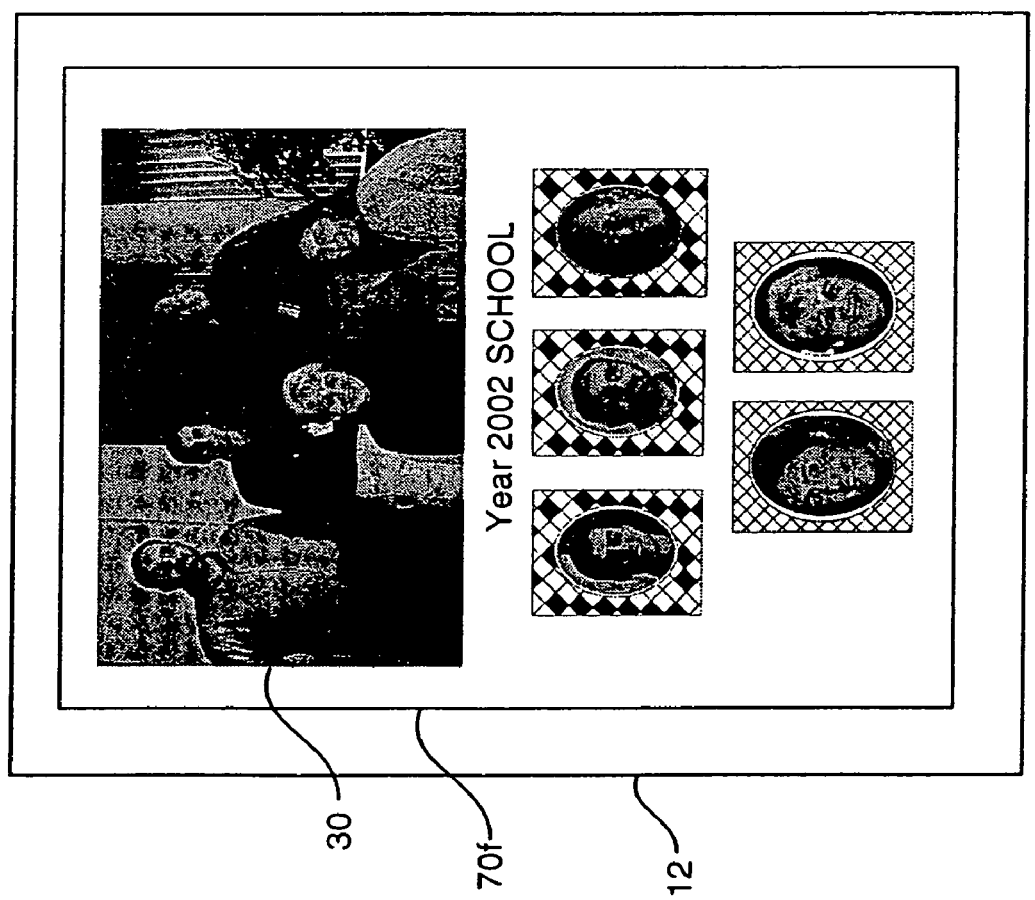
FIG. 24 shows a sixth photo collage generated using a method in accordance with the present invention.

The photo collage can also comprise the digital still image. FIG. 24 shows photo collage 70f comprising the plurality of categorized template images and digital still image 30.

The template can be selected by the categorization. That is, the template can be appropriate for the category. For example, for the instant example, template T11 may include images associated with boys (e.g., blue colors, trucks, cars, planes) while template T10 may include images associated with girls (e.g., pink colors, dolls, ribbons, stuffed animals).

The method in accordance with the seventh embodiment may be desired for sporting event photographs. For example, if two teams are displayed in a digital still image, the content can be categorized by uniform (team) color, and specific templates associated with each team.

Action play cards might also be considered as the subject image if video segments are available. That is, the digital still image might be obtained from a video segment.

Eighth Embodiment

An eight embodiment of the present invention is now disclosed wherein a template is provided which complements the content of the detected subject. More specifically, it may be desirable to have the design of the template complement the subject. For example, if the detected subject is a young girl, it would be preferable if the templates were age appropriate. That is, the design of the template should complement the subject.

Object recognition software is available to analyze the content of the digital image. Other software and/or algorithms may be known to those skilled in the art for analyzing the content of a digital image. U.S. Pat. No. 6,157,435 (Slater), commonly-assigned and incorporated herein by reference, relates to content recognition and image recognition.

Using such object recognition software, the content of the detected subject image can be determined. Then, the content can be categorized to determine a complementary design for a template. For example, if the content of the subject image is determined to be a horse, the content can be categorized to provide template designs of barns, farm scenes, carriages, saddles, and the like.

Conversely, if the user selects a particular template having a specific design, the object recognition software can determine which detected subject image most closely complements the template. For example, if the digital image includes people, a horse and dog, and the user selects a template having a barn scene, then the system could automatically position the horse subject image within the selected template (the horse being more associated with a barn than a person or dog).

Other

It is recognized that the subject images can be obtained from multiple digital still images. That is, one subject image might be selected from digital still image 30 while a second subject image might be selected from a digital still image 30. Accordingly, it is understood that the digital imaging device can be configured to display a plurality of subject images from a plurality of digital still images. In such a situation, it may be desirable to employ the third embodiment since it the linear arrangement of the plurality of subject images (shown in FIG. 12) might more readily provide viewing of a plurality of subject images.

Editing

Means can be provided to edit the arrangement of the subject images within the predetermined layout. For example, referring again to FIG. 19, the user may desire to exchange the location of subject image I4 with subject image I1. Such means for rearranging images within predetermined areas are known to those skilled in the art. For example, a "drag and drop" operation could be conducted. Alternatively, a barcode or other identification information can be used to indicate which image to place in a particular location of the layout. For example, digital school photography systems typically match a scanned barcode containing student information (e.g., student name, school, classroom) with the captured image and this information is written to a jpg header of the image when it is captured. This information can be employed to arrange individual images alphabetically into predetermined positions in a "class" photo.

Textual information can be added, either on the template or photo collage or subject image. If this information is available from metadata or the jpeg header, then the textual information could be added automatically by the system.

Editing of the content of the subject images can also be accomplished. For example, blemishes can be removed, scratches or other artifacts can be removed, glare can be reduced, density can be improved, color can be improved, contrast can be improved, saturation can be improved, sharpness can be improved, noise can be reduced, red-eye artifacts can be removed, and the like.

In addition, context sensitive backgrounds can also be utilized that complement the detected object. Examples include: barns, fields, and fences for complementing horses as the object of interest; and theme-based backgrounds such as sports backgrounds for sports team pictures.

Computer Program

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

Video Segments

The present invention can employ video clip segments, that is, one or more frames from a video clip. It may be desired to provide a template with a plurality of frames to provide "motion" within the predetermined locations within the template. More particularly, a particular subject can be identified from the video clip, and algorithms can be employed to "track" the subject in the video clip and extract the particular frames for insertion into the predetermined location.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

Steps 100-104
Steps 200-212
Steps 300-312
10 Kiosk
12 display
13 keyboard
14 scanner
15 input port
16 delivery section
18 communication network
20 third party
22 digital camera
24 removable memory disk
30 still image
32 instructional message
34A, B selection members
36 selection member
38 selection member
40 menu
42 selection member
44 selection member
46 order menu
48 print selection member
50A selection member
50B selection member
52 preview area
54 continue selection member
56 predetermined location
58 candidate image preview area
60 subject number menu
62 preview area
70a photo collage
70b photo collage
70c photo collage
70d photo collage
70e photo collage
70f photo collage
72 textual information
I1-I5 subject images
C1-C8 candidate images
T1-T6 templates
T10-T11 templates
CT1-CT9 candidate templates
T11-T15 plurality of template images

What is claimed is:

1. A method of generating an image, comprising the steps of:
a computer performing the steps of:
accessing a digital still image comprising a plurality of subjects;
applying a subject detection algorithm to the digital still image to detect the plurality of subjects to generate a plurality of subject images, each of the subject images comprising at least one detected subject;
displaying the plurality of subject images on a display of an imaging device;
providing a selection member for selecting at least one of the plurality of subject images;
displaying, on the display, a plurality of candidate images, each of the candidate images comprising a template and the selected at least one of the plurality of subject images, the template of one candidate image differing from the template of another candidate image;
providing a selection member for selecting one of the plurality of candidate images; and
displaying on the display the selected one of the plurality of candidate images.

2. The method of claim 1, further comprising the step of, prior to displaying the plurality of subject images on the display, displaying the digital still image on the display.

3. The method of claim 1, wherein the step of displaying the plurality of subject images is accomplished by categorizing the content of each of the plurality of subject images, and displaying the plurality of subject images by category.

4. The method of claim 3, wherein the templates are provided in accordance with the category.

5. The method of claim 1, further comprising the step of storing, transmitting, or printing the selected one of the plurality of candidate images.

6. The method of claim 1, further comprising the step of providing, on the display proximate the displayed selected one of the plurality of candidate images, an order menu adapted to receive an image order for the selected one of the plurality of candidate images.

7. The method of claim 1, further comprising the step of providing textual information or instructional information on the display.

8. The method of claim 1, further comprising the step of allowing a user to zoom and/or crop the selected one of the plurality of candidate images to generate a modified candidate image.

9. The method of claim 1, further comprising the step of providing an indicating member for indicating a number of subject images to be selected.

10. The method of claim 1, wherein each template includes a predetermined location adapted to receive one of the plurality of subject images.

11. The method of claim 1, further comprising the step of printing, storing, or transmitting the selected one of the plurality of candidate images.

12. The method of claim 1, further comprising the step of providing textual information on the selected one of the plurality of candidate images.

13. A method of generating an image, comprising the steps of:
a computer performing the steps of:
accessing a digital still image comprising a plurality of subjects;
applying a subject detection algorithm to the digital still image to detect the plurality of subjects to generate a plurality of subject images, each of the subject images comprising at least one detected subject;
displaying the plurality of subject images on the display of the imaging device;
providing a selection member for selecting at least one of the plurality of subject images;
displaying, on the display, the selected at least one of the plurality of subject images and a plurality of candidate templates, one candidate template differing from another candidate template;
providing a selection member for selecting one of the candidate templates; and
displaying, on the display, a candidate image comprising the selected at least one of the plurality of subject images and the selected one of the candidate templates.

14. The method of claim 13, further comprising the step of, prior to displaying the plurality of subject images on the display, displaying the digital still image on the display.

15. The method of claim 13, further comprising the step of storing, transmitting, or printing the candidate image.

16. The method of claim 13, further comprising the step of providing, on the display proximate the displayed candidate image, an order menu adapted to receive an image order for the candidate image.

17. The method of claim 13, further comprising the step of providing textual information or instructional information on the display.

18. The method of claim 13, further comprising the step of allowing a user to zoom and/or crop the displayed candidate image to generate a modified candidate image.

19. The method of claim 13, wherein each candidate template includes a predetermined location adapted to receive one of the plurality of subject images.

20. The method of claim 13, further comprising the step of, prior to displaying the selected at least one of the plurality of subject images and a plurality of candidate templates, providing an indicating member for indicating a number of subject images to be selected.

21. The method of claim 13, wherein the step of displaying the plurality of subject images is accomplished by categorizing the content of each of the plurality of subject images, and displaying the plurality of subject images by category.

22. The method of claim 21, wherein the templates are provided in accordance with the category.

23. The method of claim 13, further comprising the step of printing, storing, or transmitting the candidate image.

24. The method of claim 13, further comprising the step of providing textual information on the candidate image.

* * * * *